(12) United States Patent
Fang et al.

(10) Patent No.: US 8,491,234 B2
(45) Date of Patent: Jul. 23, 2013

(54) DOUBLE-SIDED CUTTING INSERTS FOR HIGH FEED MILLING

(75) Inventors: X. Daniel Fang, Brentwood, TN (US); Jean-Luc Dufour, Franklin, TN (US); David J. Wills, Franklin, TN (US)

(73) Assignee: TDY Industries, LLC, Pittsburgh, PA (US)

( * ) Notice: Subject to any disclaimer, the term of this patent is extended or adjusted under 35 U.S.C. 154(b) by 493 days.

(21) Appl. No.: 12/854,382

(22) Filed: Aug. 11, 2010

(65) Prior Publication Data

US 2010/0303563 A1 Dec. 2, 2010

Related U.S. Application Data

(63) Continuation-in-part of application No. 12/369,796, filed on Feb. 12, 2009, now Pat. No. 7,976,250.

(51) Int. Cl.
*B23C 5/109* (2006.01)
*B23C 5/202* (2006.01)

(52) U.S. Cl.
USPC .......................................... 407/113; 407/114

(58) Field of Classification Search
USPC ................... 407/113, 114, 115, 116
See application file for complete search history.

(56) References Cited

U.S. PATENT DOCUMENTS

| | | |
|---|---|---|
| 1,838,520 A | 12/1931 | Archer |
| 3,399,442 A | 9/1968 | Jones et al. |
| 3,557,416 A | 1/1971 | Jones |
| 3,621,549 A | 11/1971 | Billups |
| 3,805,349 A | 4/1974 | Nose |
| 3,806,713 A | 4/1974 | Ryberg |

(Continued)

FOREIGN PATENT DOCUMENTS

| | | |
|---|---|---|
| CN | 1041499 C | 1/1999 |
| CN | 1041901 C | 2/1999 |

(Continued)

OTHER PUBLICATIONS

U.S. Appl. No. 12/641,399, filed Dec. 18, 2009.

(Continued)

*Primary Examiner* — Will Fridie, Jr.
(74) *Attorney, Agent, or Firm* — K & L Gates LLP; Patrick J. Viccaro; John E. Grosselin, III

(57) ABSTRACT

A double-sided cutting insert with a plurality of indexable convex cutting edges can have a top face and a bottom face, at least three convex cutting edges on each face connected by at least three nose corners, at least three peripheral side surfaces extending from each face toward a virtual middle plane; and a common lateral seating surface on each peripheral side surface. Each convex cutting edge can have at least a curved cutting edge region, and can further have a primary substantially straight cutting edge region intermediate the curved cutting edge region and the nose corner. Each peripheral side surface can further have a primary planar facet associated with the primary substantially straight cutting edge, and each face may also be single-handed in same direction. Additionally, in various embodiments, the top and bottom faces of the cutting insert may be formed such that they are twisted or rotated with respect to each other. Further, additional cutting edges, edge regions, and/or surfaces may be included in a cutting insert in various embodiments. In such embodiments, the cutting insert or inserts may provide a powerful ramping function during milling operations.

38 Claims, 17 Drawing Sheets

U.S. PATENT DOCUMENTS

Figure 1:
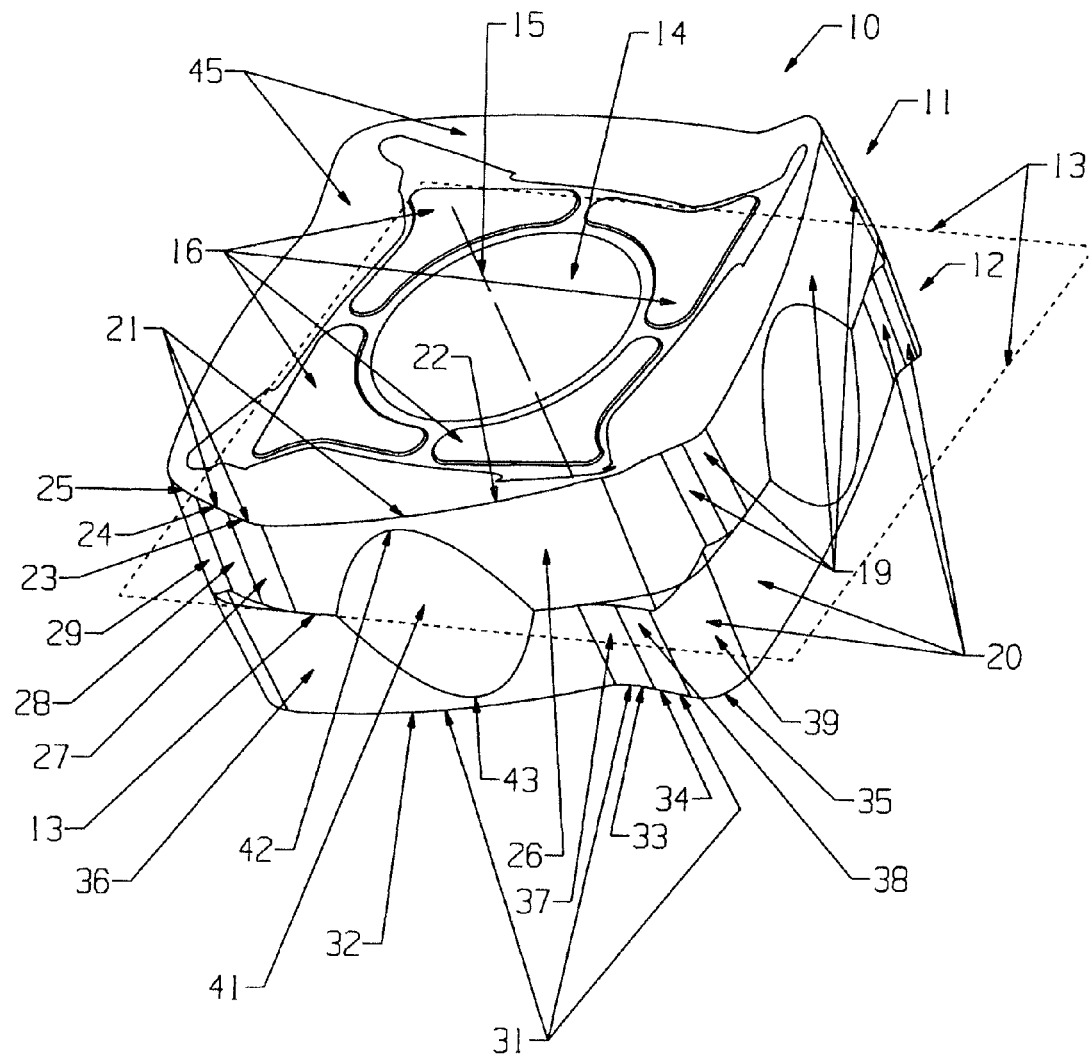

| | | | |
|---|---|---|---|
| 4,274,766 A | 6/1981 | Raupp et al. | |
| 4,294,565 A | 10/1981 | Erkfritz | |
| 4,461,602 A | 7/1984 | Zettl | |
| 4,493,596 A | 1/1985 | Grunsky et al. | |
| 4,595,322 A | 6/1986 | Clement | |
| 4,659,264 A | 4/1987 | Friedline | |
| 4,681,488 A | 7/1987 | Markusson | |
| 4,699,549 A | 10/1987 | Shimomura et al. | |
| 4,760,548 A | 7/1988 | Baker et al. | |
| 4,940,369 A | 7/1990 | Aebi et al. | |
| 5,052,863 A | 10/1991 | Satran | |
| 5,071,292 A | 12/1991 | Satran | |
| 5,092,718 A | 3/1992 | Shallenberger | |
| 5,094,572 A | 3/1992 | Alsbury et al. | |
| 5,137,398 A | 8/1992 | Omori et al. | |
| 5,145,294 A | 9/1992 | Flueckiger | |
| 5,145,295 A | 9/1992 | Satran | |
| 5,193,946 A | 3/1993 | Arai et al. | |
| 5,203,649 A | 4/1993 | Katbi et al. | |
| 5,226,761 A | 7/1993 | Satran et al. | |
| 5,244,318 A | 9/1993 | Arai et al. | |
| 5,246,315 A | 9/1993 | Hansson et al. | |
| 5,333,972 A | 8/1994 | Bernadic et al. | |
| 5,338,135 A | 8/1994 | Noguchi et al. | |
| 5,340,246 A | 8/1994 | Tukala | |
| 5,346,336 A | 9/1994 | Rescigno | |
| 5,377,116 A | 12/1994 | Wayne et al. | |
| 5,388,932 A | 2/1995 | DeRoche et al. | |
| 5,408,598 A | 4/1995 | Pryor, Jr. | |
| 5,421,679 A | 6/1995 | Pantzar et al. | |
| 5,443,335 A | 8/1995 | Shimano et al. | |
| 5,454,670 A | 10/1995 | Noda et al. | |
| 5,474,407 A | 12/1995 | Rodel et al. | |
| 5,586,843 A | 12/1996 | Minicozzi | |
| 5,593,255 A | 1/1997 | Satran et al. | |
| 5,634,745 A | 6/1997 | Wiman et al. | |
| 5,658,100 A | 8/1997 | Deiss et al. | |
| 5,688,081 A | 11/1997 | Paya | |
| 5,695,303 A | 12/1997 | Boianjiu et al. | |
| 5,725,334 A | 3/1998 | Paya | |
| 5,762,453 A | 6/1998 | Arai et al. | |
| 5,791,831 A | 8/1998 | Shimano et al. | |
| 5,791,833 A | 8/1998 | Nielbauer | |
| 5,791,883 A | 8/1998 | Ban et al. | |
| 5,803,674 A | 9/1998 | Satran et al. | |
| 5,951,212 A | 9/1999 | Emoto et al. | |
| 5,957,629 A * | 9/1999 | Hessman et al. | 407/113 |
| 5,957,635 A | 9/1999 | Nuzzi et al. | |
| 5,971,676 A | 10/1999 | Kojima | |
| 6,050,752 A | 4/2000 | DeRoche | |
| 6,053,671 A | 4/2000 | Stedt et al. | |
| 6,100,904 A | 8/2000 | Gupta | |
| 6,142,716 A * | 11/2000 | Jordberg et al. | 407/114 |
| 6,152,658 A | 11/2000 | Satran et al. | |
| 6,186,705 B1 | 2/2001 | Kumar et al. | |
| 6,238,133 B1 | 5/2001 | DeRoche et al. | |
| 6,244,791 B1 | 6/2001 | Wiman et al. | |
| 6,270,297 B1 | 8/2001 | Fang et al. | |
| 6,540,448 B2 | 4/2003 | Johnson | |
| 6,543,970 B1 * | 4/2003 | Qvarth et al. | 407/114 |
| 6,599,061 B1 | 7/2003 | Nelson | |
| 6,623,217 B2 | 9/2003 | Brockett et al. | |
| 6,655,881 B2 | 12/2003 | Shimizu | |
| 6,669,412 B1 | 12/2003 | Hirose et al. | |
| 6,684,742 B1 | 2/2004 | White | |
| 6,715,967 B2 | 4/2004 | Wiman et al. | |
| 6,722,824 B2 | 4/2004 | Satran et al. | |
| 6,769,844 B2 | 8/2004 | Waggle | |
| 6,811,359 B2 | 11/2004 | Craig | |
| 6,835,028 B2 | 12/2004 | Usui et al. | |
| 6,884,006 B2 | 4/2005 | Nagashima | |
| 6,921,233 B2 | 7/2005 | Duerr et al. | |
| 6,929,427 B2 | 8/2005 | Satran | |
| 6,929,429 B2 | 8/2005 | Riviére | |
| 6,957,935 B2 | 10/2005 | Sung et al. | |
| 6,960,049 B2 | 11/2005 | Inayama | |
| 7,021,871 B2 | 4/2006 | Arvidsson et al. | |
| 7,037,051 B2 | 5/2006 | Wermeister | |
| 7,070,363 B2 * | 7/2006 | Long et al. | 407/113 |
| 7,104,736 B2 * | 9/2006 | Satran et al. | 407/113 |
| 7,147,407 B2 * | 12/2006 | Satran | 407/42 |
| 7,201,545 B2 | 4/2007 | Ejderklint | |
| 7,220,083 B2 | 5/2007 | Festeau et al. | |
| 7,232,279 B2 | 6/2007 | Smilovici et al. | |
| 7,234,899 B2 | 6/2007 | Fang et al. | |
| 7,241,082 B2 | 7/2007 | Smilovici et al. | |
| 7,281,884 B2 | 10/2007 | Maeda | |
| 7,306,409 B2 | 12/2007 | Stabel et al. | |
| 7,325,471 B2 | 2/2008 | Massa et al. | |
| 7,393,163 B2 | 7/2008 | Edvardsson et al. | |
| 7,494,303 B2 | 2/2009 | Koskinen | |
| 7,537,419 B2 | 5/2009 | Sjoberg et al. | |
| 7,547,164 B2 | 6/2009 | Hessman | |
| 7,600,952 B2 | 10/2009 | Festeau et al. | |
| 7,604,440 B2 | 10/2009 | Fouquer | |
| 7,687,156 B2 | 3/2010 | Fang et al. | |
| 7,806,634 B2 | 10/2010 | Festeau et al. | |
| 7,905,687 B2 | 3/2011 | Dufour et al. | |
| 7,905,689 B2 | 3/2011 | Dufour et al. | |
| 8,096,735 B2 * | 1/2012 | Sladek et al. | 407/114 |
| 8,277,151 B2 * | 10/2012 | Wandeback | 407/42 |
| 2003/0031520 A1 | 2/2003 | Hintze et al. | |
| 2003/0206777 A1 | 11/2003 | Gyllengahm | |
| 2003/0226694 A1 | 12/2003 | Moseley | |
| 2006/0115340 A1 | 6/2006 | Nishio et al. | |
| 2006/0245837 A1 | 11/2006 | Dufour et al. | |
| 2007/0041798 A1 | 2/2007 | Nasu et al. | |
| 2008/0304924 A1 | 12/2008 | Engstrom | |
| 2010/0080662 A1 | 4/2010 | Satran et al. | |
| 2010/0183386 A1 | 7/2010 | Heinloth et al. | |
| 2010/0202839 A1 | 8/2010 | Fang et al. | |
| 2010/0272526 A1 | 10/2010 | Dufour et al. | |
| 2010/0284753 A1 | 11/2010 | Festeau et al. | |
| 2010/0329800 A1 * | 12/2010 | Edler et al. | 407/114 |
| 2011/0110731 A1 | 5/2011 | Dufour et al. | |
| 2011/0150586 A1 | 6/2011 | Fang et al. | |
| 2011/0250025 A1 | 10/2011 | Festeau et al. | |

FOREIGN PATENT DOCUMENTS

| | | |
|---|---|---|
| CN | 1045557 C | 10/1999 |
| CN | 1117646 C | 8/2003 |
| DE | 4118070 C2 | 2/1995 |
| DE | 4400538 A1 | 7/1995 |
| EP | 0035848 B1 | 2/1985 |
| EP | 0285660 A1 | 10/1988 |
| EP | 1157768 A1 | 11/2001 |
| EP | 1205877 A1 | 5/2002 |
| EP | 1346789 B1 | 11/2006 |
| EP | 1749602 A2 | 2/2007 |
| EP | 1952925 A2 | 8/2008 |
| EP | 2119520 A1 | 11/2009 |
| FR | 2364724 A1 | 4/1978 |
| GB | 2298600 A | 9/1996 |
| JP | 49-32280 A | 3/1974 |
| JP | 52-103081 A | 8/1977 |
| JP | 59-214501 A | 12/1984 |
| JP | 4-315510 A | 11/1992 |
| JP | 5-285708 A | 11/1993 |
| JP | 8-039329 | 2/1996 |
| JP | 8-174327 A | 7/1996 |
| JP | 11-129109 A | 5/1999 |
| JP | 2002-301603 | 10/2002 |
| JP | 2003-275920 | 9/2003 |
| SU | 344930 A | 8/1972 |
| SU | 814573 A1 | 3/1981 |
| SU | 1504006 A1 | 8/1989 |
| WO | WO 92/21467 A1 | 12/1992 |
| WO | WO 94/12302 A1 | 6/1994 |
| WO | WO 95/00272 A1 | 1/1995 |
| WO | WO 95/32071 A1 | 11/1995 |
| WO | WO 96/35538 A1 | 11/1996 |
| WO | WO 02/18083 A2 | 3/2002 |
| WO | WO 02/20206 A1 | 3/2002 |
| WO | WO 02/102536 A1 | 12/2002 |
| WO | WO 03/099495 A1 | 12/2003 |
| WO | WO 2004/096474 A1 | 11/2004 |
| WO | WO 2006/041353 A1 | 4/2006 |

OTHER PUBLICATIONS

U.S. Appl. No. 12/967,441, filed Dec. 14, 2010.
Bourke, Paul, "Spline Curves (in 3D)", Nov. 1996, XP002300113. printed from http://astronomy.swin.edu.au/~pbourke/curves/spline/, 5 pages.
Shi dongping, et al., CAD/CAM for Cemented Carbide Indexable Inserts, J. Huazhong Univ. of Sci. & Tech., vol. 22, No. 2, Feb. 1994, with English abstract, 4 pages.
Shaw et al., "The Rotary Cutting Tool," Transactions of the ASME, Aug. 1952, Cambridge, Massachusetts, pp. 1065-1076.
Armarego et al., "Fundamental Studies of Driven and Self-Propelled Rotary Tool Cutting Processes—I. Theoretical Investigation," Int. J. Mach. Tools Manufact., vol. 34, No. 6, pp. 785-801.
Davis et al., Metals Handbook Ninth Edition, vol. 16, Machining, 1989, p. 311.
Milling Cutters and End Mills, The American Society of Mechanical Engineers, An American National Standard, ASME B94.19-1997, Revision of ANSI/ASME B94.19-1985, pp. 2-4.
Fundamentals of Tool Design, Fourth Edition, revised by Dr. John G. Nee, CMfgE, Society of Manufacturing Engineers, 1998, p. 103.
Oberg et al., 26th Edition Machinery's Handbook, A Reference Book for the Mechanical Engineer, Designer, Manufacturing Engineer, Draftsman, Toolmaker, and Machinist, Industrial Press Inc., New York, 2000, pp. 723-724.

* cited by examiner

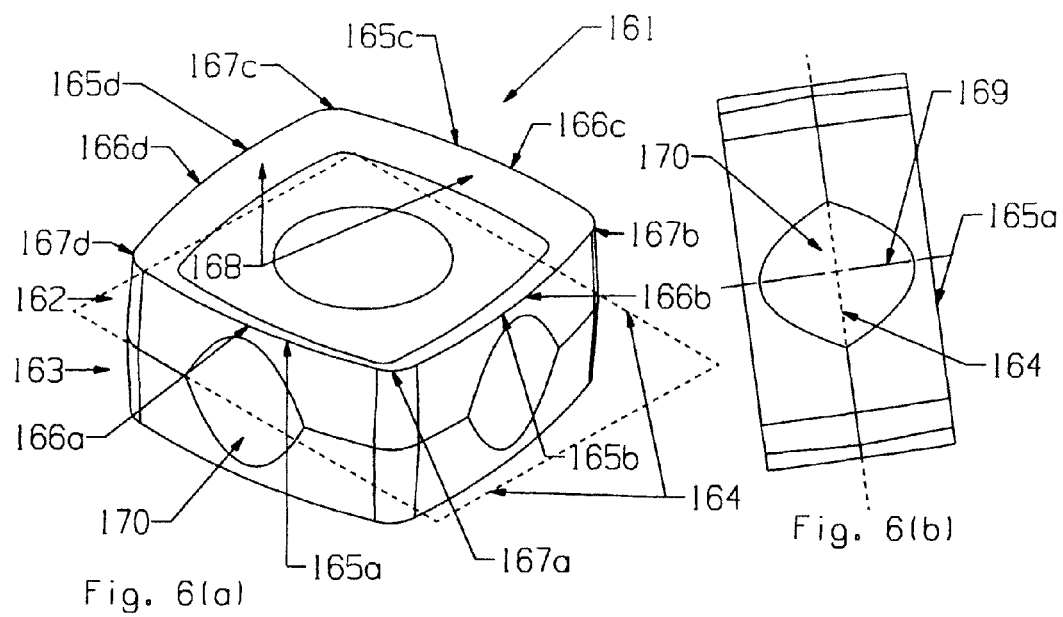
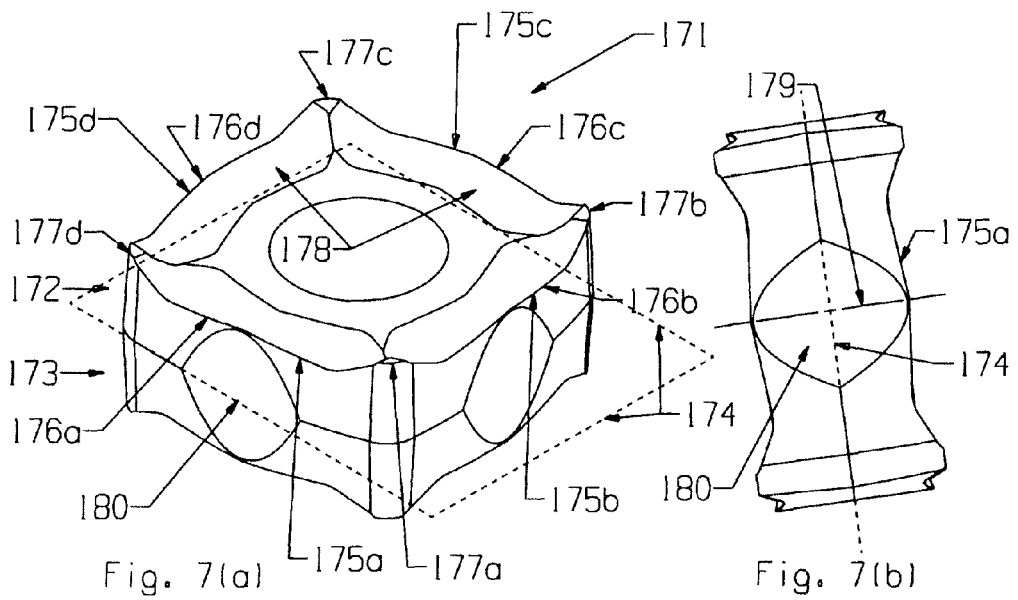
FIGURE 6
FIGURE 7

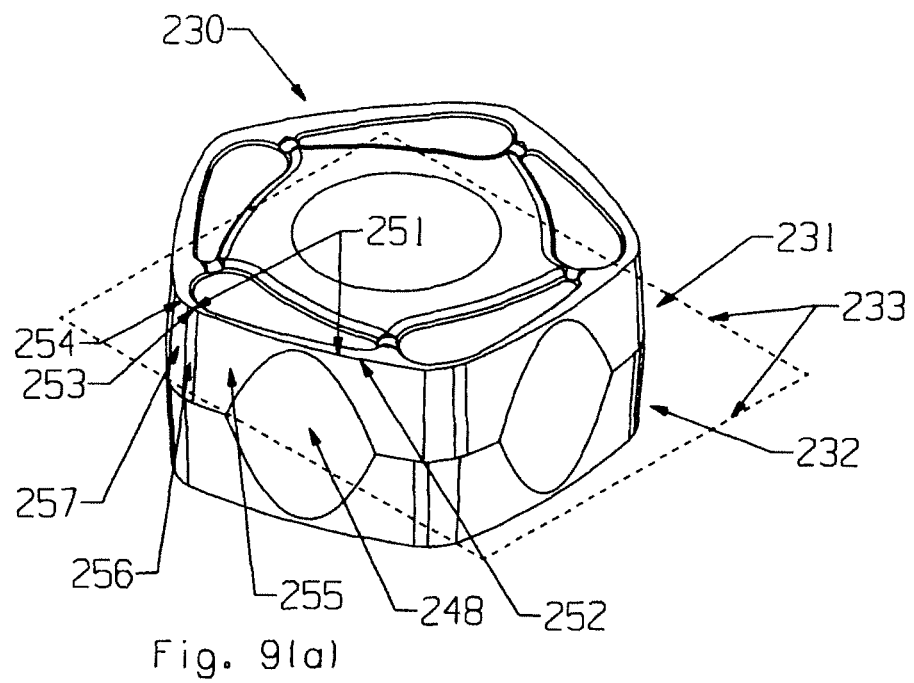
Fig. 9(a)
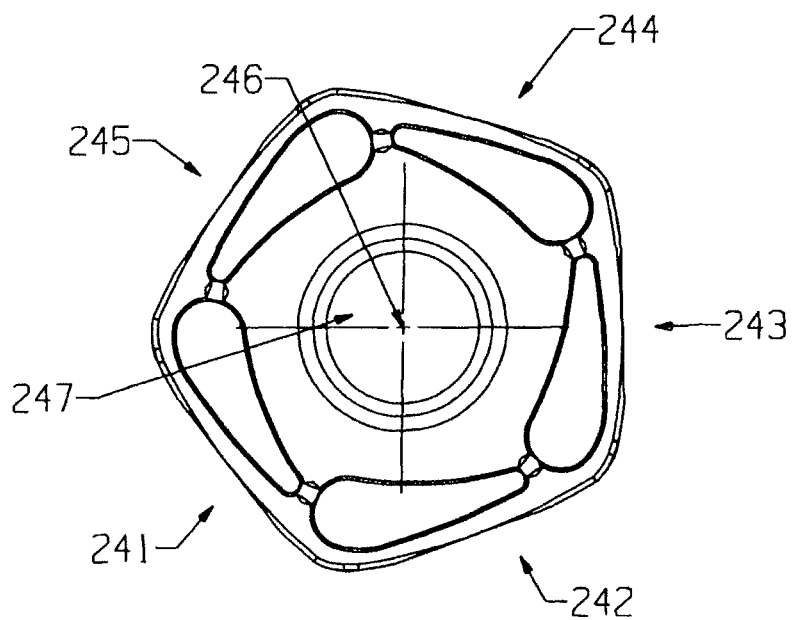
Fig. 9(b)
FIGURE 9

DOUBLE-SIDED CUTTING INSERTS FOR HIGH FEED MILLING

CROSS-REFERENCE TO RELATED APPLICATIONS

The present application is a continuation-in-part application claiming priority under 35 U.S.C. §120 from co-pending U.S. patent application Ser. No. 12/369,796, filed on Feb. 12, 2009, and entitled "Double-Sided Cutting Inserts for High Feed Milling," the entire disclosure of which is incorporated by reference herein.

BACKGROUND

The present disclosure is directed to a double-sided cutting insert. The double-sided cutting insert exhibits a combination of favorable cutting edge strength, and unique cutting edge geometry, thus, allowing milling operations at relatively high feed rates and may be useful in face milling, slot milling, plunge milling, and ramping operations.

Cutting inserts, carbide and other types, are well known in the art. Many indexable cutting inserts are single-handed, either right handed or left handed, due to the geometrical constraints in a rotary machining operation where the cutting tool is rotating against a stationary work piece being ground.

Recently, there have been increasing demands for reduced cost and high productivity in metal machining industries. Two common approaches in the design of indexable carbide cutting inserts, from geometrical point of view, are either to design a double-sided cutting insert, or to design more available cutting edges on a single-sided cutting insert. Double-sided cutting inserts can double the number of available cutting edges, and have cost reduction benefits for both cutting tool end users and cutting tool manufacturers. An ideal solution to a productive indexable cutting insert design can be an indexable cutting insert that has both more available cutting edges and is double-sided. However, the geometric design of a double-sided cutting insert for milling is a more challenging task compared to a traditional single-sided cutting insert, because of the complexity of positioning a double-sided cutting insert in an insert pocket on a cutting tool holder. The difficulty increases as the number of cutting edges increases. Furthermore, the design of a single-handed double-sided cutting insert with more indexable cutting edges for milling operations is even more challenging because the two sides of a single-handed double sided cutting insert may not be a simple mirror image of each other.

In the case of a single-handed double-sided cutting insert with convex cutting edges and conical peripheral surfaces, design is even more challenging due to the difficulties to secure the cutting inserts having convex peripheral profile as compared to commonly used double-sided cutting inserts in a shape of square, triangle or parallelogram, wherein a lateral peripheral surface is planar or perpendicular to a bottom seat face in an insert pocket of a tool holder. A single-sided cutting insert for high feed face milling is disclosed in U.S. Pat. No. 7,220,083, assigned to the assignee of the present application, and which is hereby incorporated herein by reference, and United States Patent Application Publication No. US 2007/0189864, published Aug. 16, 2007, a continuation patent application of the aforesaid U.S. Pat. No. 7,220,083, which is also assigned to the assignee of the present application, and which is also hereby incorporated herein by reference. This patent and published patent application disclose a single-sided cutting insert having four convex cutting edges, each connected by a nose corner, and each convex cutting edge having a curved cutting edge region and one or more substantially straight cutting edge regions. The curved cutting edge region has a large radius to facilitate high feed face milling operations. However, this insert is single-sided, thus having only four indexable cutting edges.

Double-sided cutting inserts are disclosed in a number of U.S. patents. For example, U.S. Pat. Nos. 6,929,429; 7,232,279; 7,241,082; 6,921,233; 7,306,409; and 6,543,970. The double-sided cutting inserts described above provide more indexable cutting edges, but the cutting edges of these inserts can be less desirable for high feed milling operations than the cutting edges of the single-sided cutting insert described in the aforesaid United States Patent Application Publication No. US 2007/0189864.

Therefore, it would be desirable to produce a double-sided cutting insert having eight indexable cutting edges, wherein each cutting edge has features to facilitate high feed milling operations as described in the aforesaid United States Patent Application Publication No. US 2007/0189864.

SUMMARY

The present disclosure describes embodiments of a double-sided cutting insert for milling operations, such as, face milling, slot milling, plunge milling, and ramping operations. Various embodiments describe one or more double-sided cutting inserts which may provide six or eight indexable cutting edges, each exhibiting a combination of favorable cutting edge strength and unique cutting edge geometry to facilitate milling operations at relatively high feed rates.

More particularly, embodiments of a double-sided cutting insert having a plurality of indexable convex cutting edges can generally comprise: a top face and a bottom face separated by a virtual middle plane; at least three convex cutting edges on each of the top and bottom faces, each convex cutting edge having at least a curved cutting edge region; at least three nose corners on each of the top and bottom faces, each nose corner connecting two of the convex cutting edges; and at least three peripheral side surfaces extending from each of the top and bottom faces to the virtual middle plane. Each peripheral side surface can comprise a first primary conical peripheral surface extending from a primary curved convex cutting edge region at the top face toward a twisted secondary curved convex cutting edge region at the bottom face, and a second primary conical peripheral surface extending from a secondary curved convex cutting edge region at the top face toward a twisted primary curved convex cutting edge region at the bottom face; a first primary planar surface extending from a primary substantially straight cutting edge region at the top face to a virtual middle plane, and a second primary planar surface extending from a primary substantially straight cutting edge region at the bottom face toward a virtual middle plane, wherein both the first and second primary planar surfaces are truncated by at least a common lateral seating face which is perpendicular to both the top and bottom faces; and a secondary conical peripheral surface extending from a nose corner toward the virtual middle plane.

In various embodiments a milling tool system is described. The milling tool system can comprise a cutter body and at least one double-sided cutting insert, such as one or more of the cutting inserts summarized above.

These and other advantages will be apparent upon consideration of the following description of certain embodiments in connection with the following drawing figures.

BRIEF DESCRIPTION OF THE DRAWING FIGURES

Figure 4:
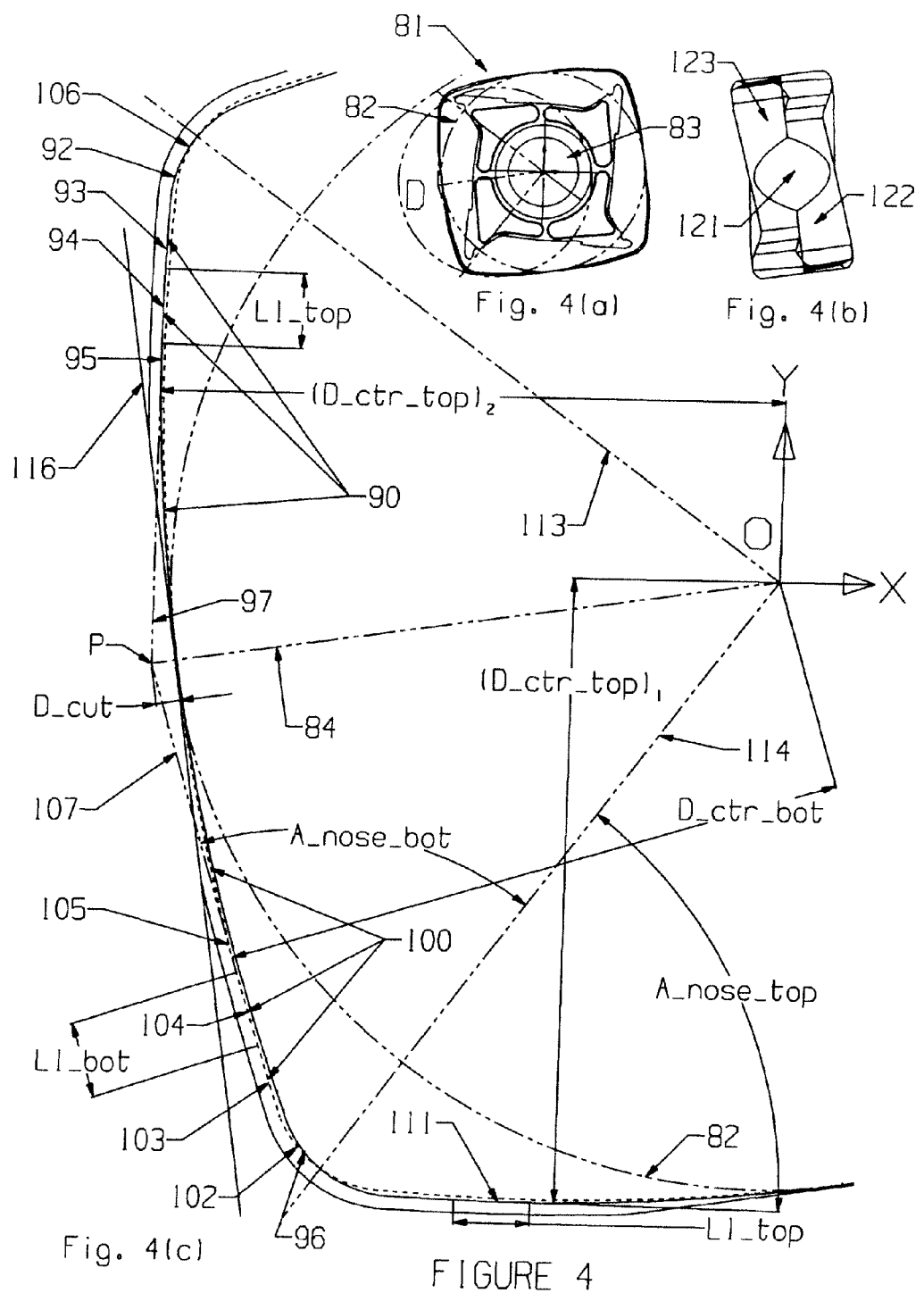
Figure 8:
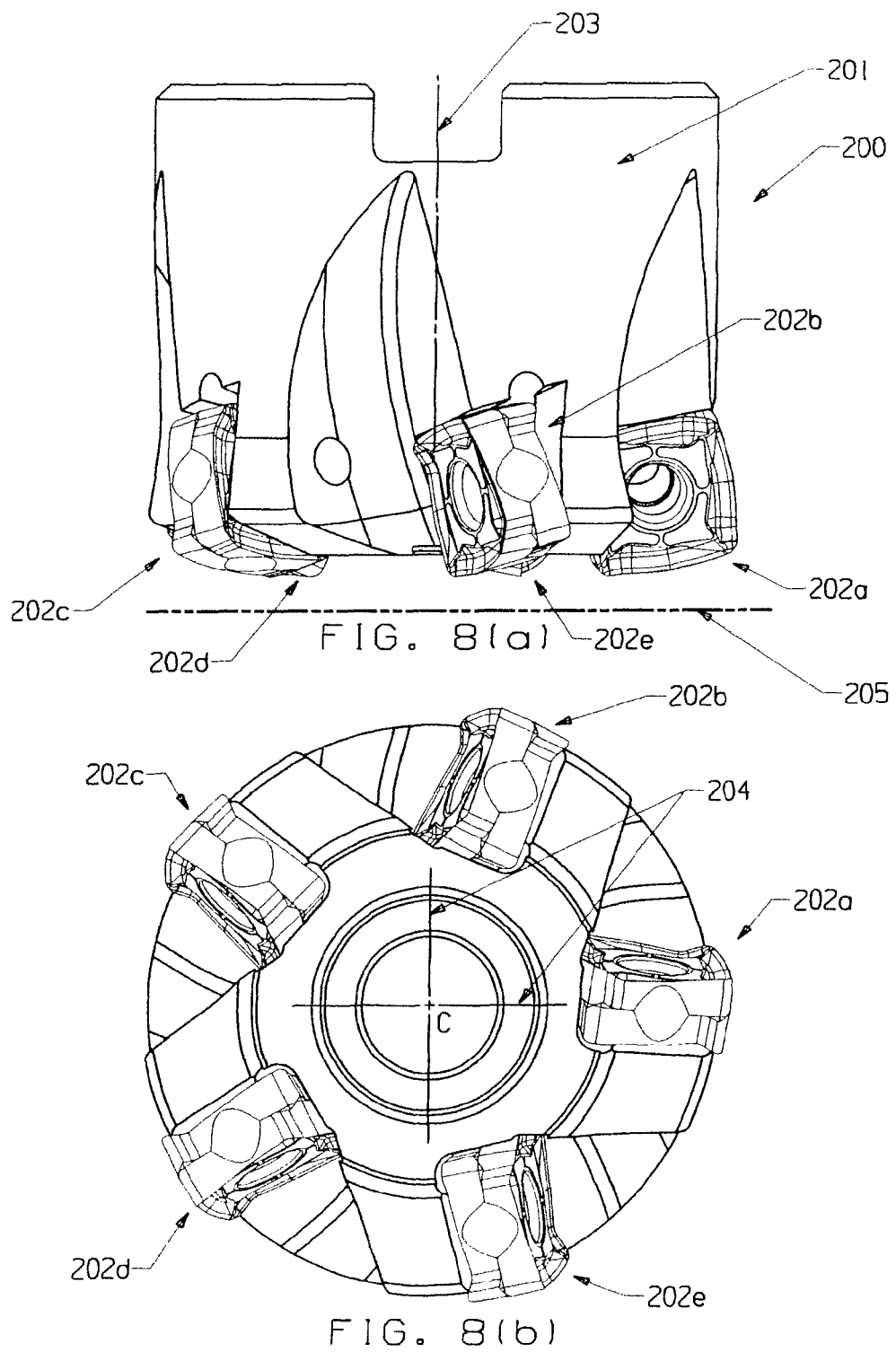
Figures 10, 10A, 10B:
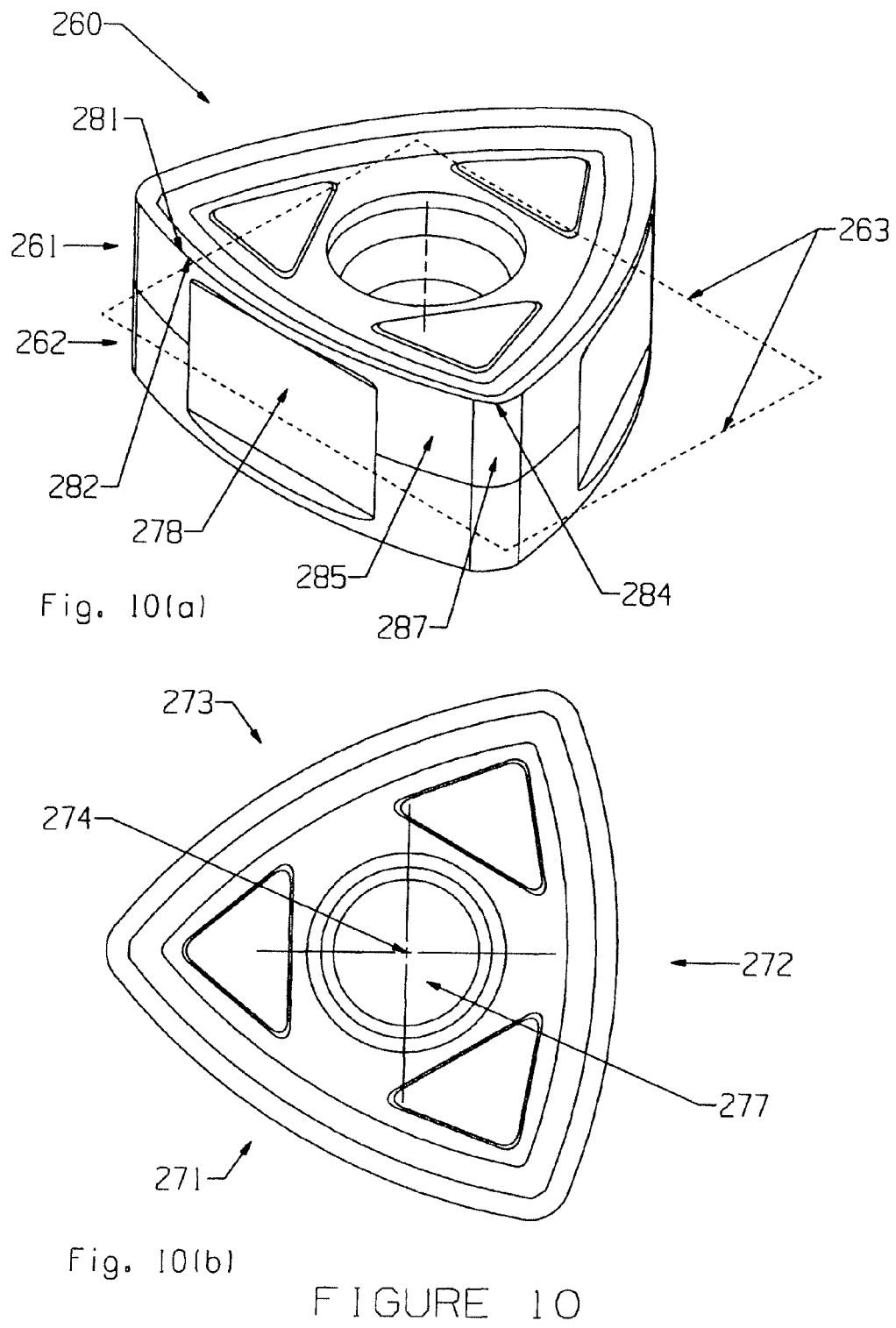

Embodiments of the double-sided cutting insert can be best understood by reference to the following drawing figures, wherein:

FIG. 1 is a perspective view of an embodiment of a double-sided single-handed cutting insert;

FIGS. 2(a)-2(c) illustrate details of the double-sided single-handed cutting insert shown in FIG. 1;

FIGS. 3(a) and 3(b) illustrate top and detail views of a nose corner of a the double-sided single-handed cutting insert shown in FIG. 1;

FIGS. 4(a)-4(c) facilitate an understanding of the mathematical relationship between the single-handed geometry of both sides of the cutting insert shown in FIG. 1;

FIGS. 5(a)-5(c) illustrate another embodiment of a double-sided single-handed cutting insert;

FIGS. 6(a) and 6(b) illustrate a further embodiment of a double-sided single-handed cutting insert;

FIGS. 7(a) and 7(b) illustrate yet another embodiment of a double-sided single-handed cutting insert;

FIGS. 8(a) and 8(b) show side and top views of a milling tool holder with double-sided cutting inserts secured thereto;

FIGS. 9(a) and 9(b) illustrate an embodiment of a double-sided cutting insert having five sides;

FIGS. 10(a) and 10(b) illustrate an embodiment of a double-sided cutting insert having three sides; and FIGS. 11(a) and 11(b) illustrate a further embodiment of a double-sided cutting insert having three sides.

Figure 12A:
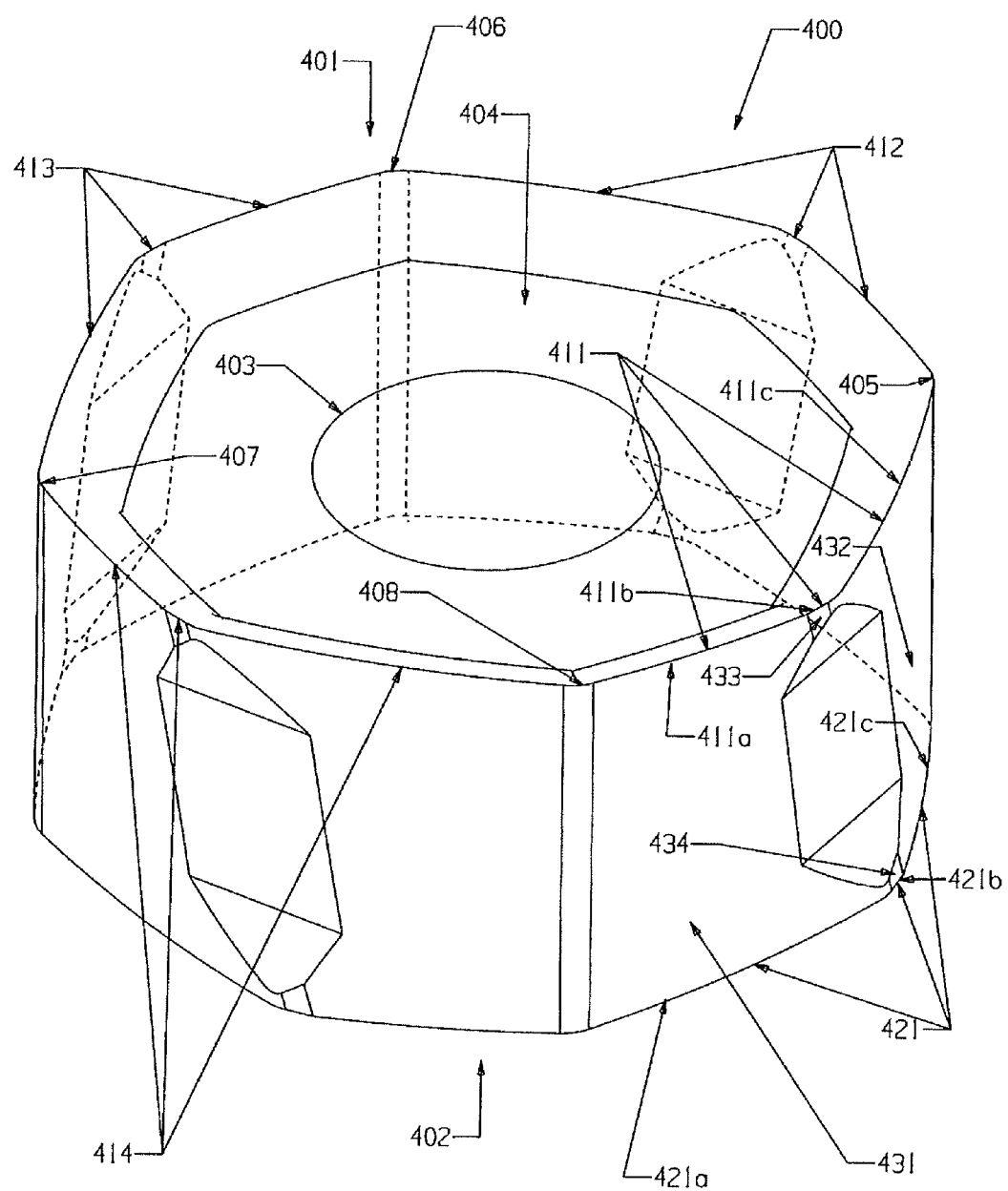
Figure 12B:
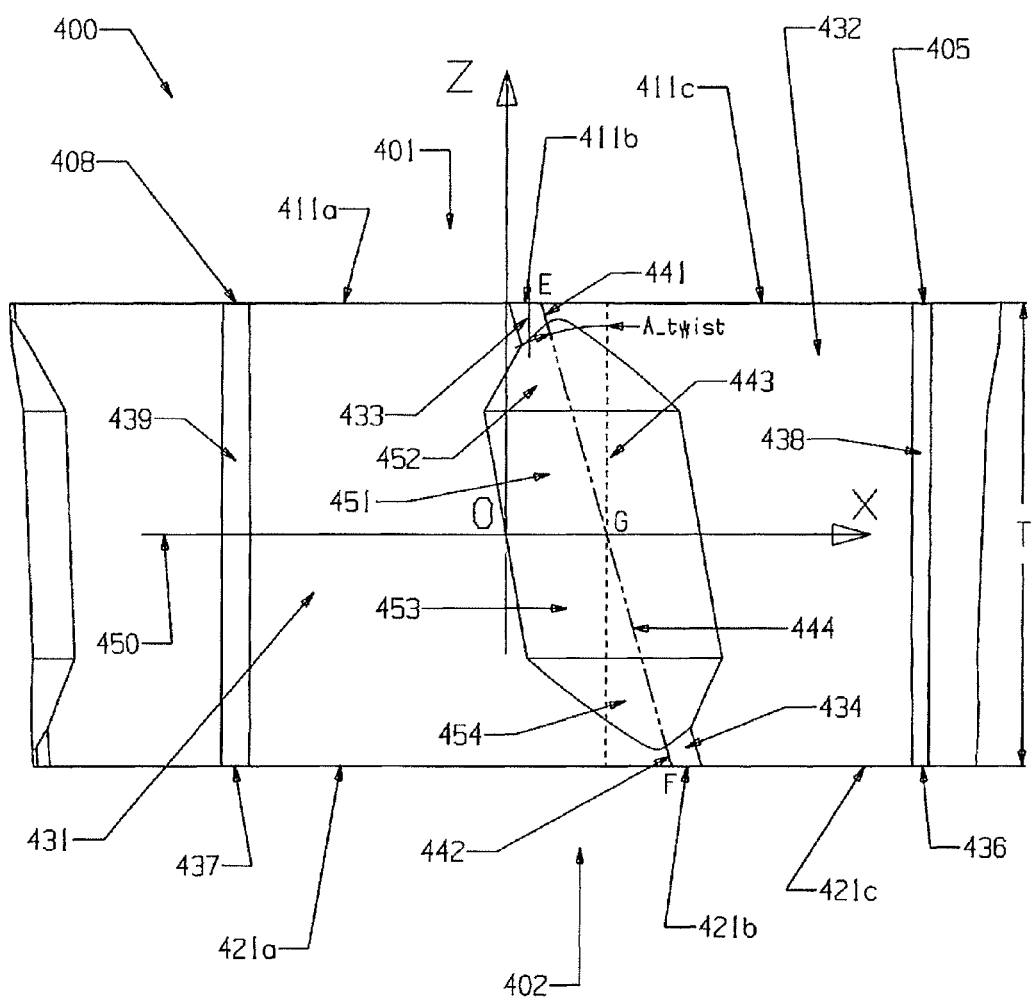
Figures 12, 12C:
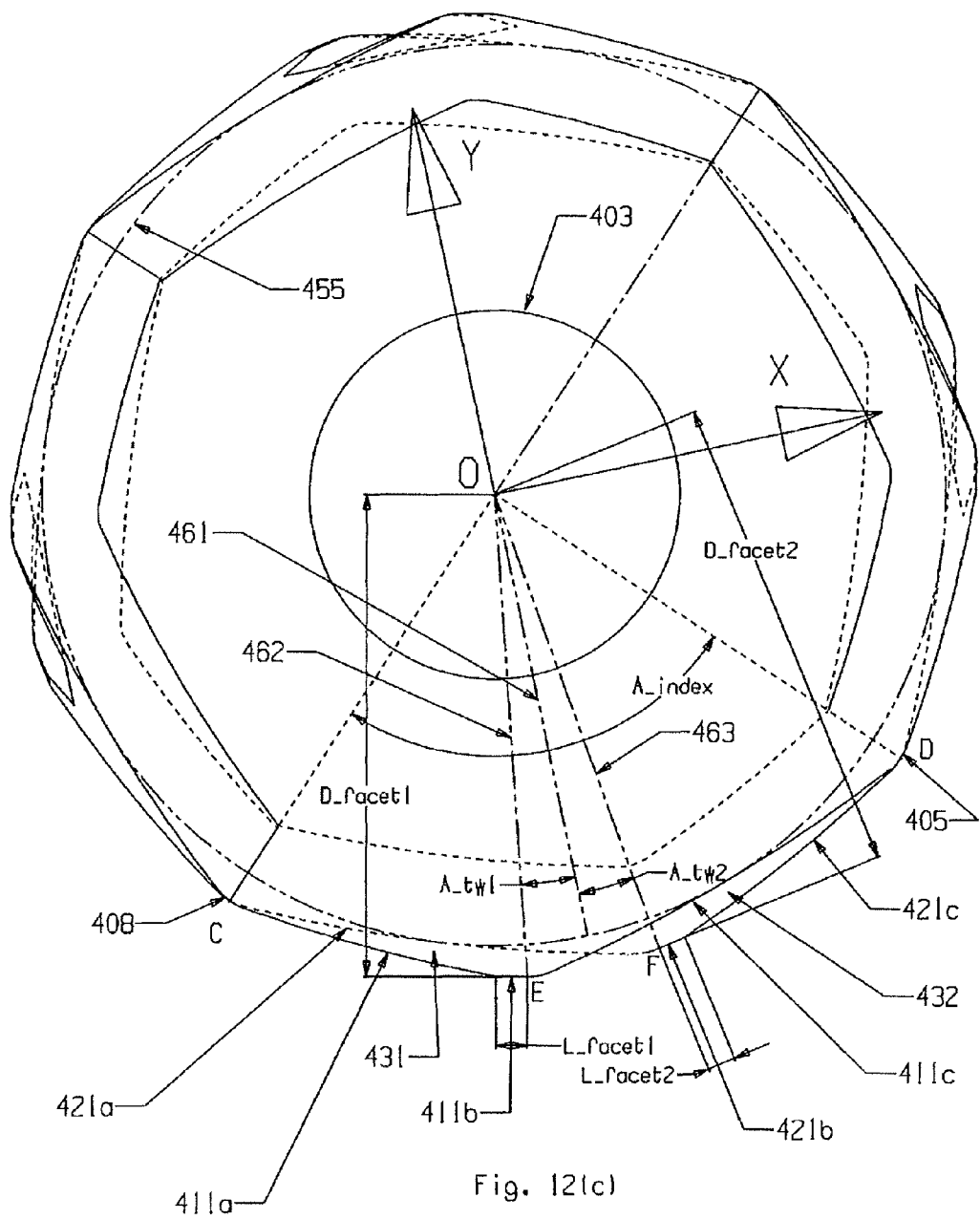

FIGS. 12(a)-12(c) illustrate an embodiment of a double-sided cutting insert having four sets of cutting edges per side.

Figure 13A:
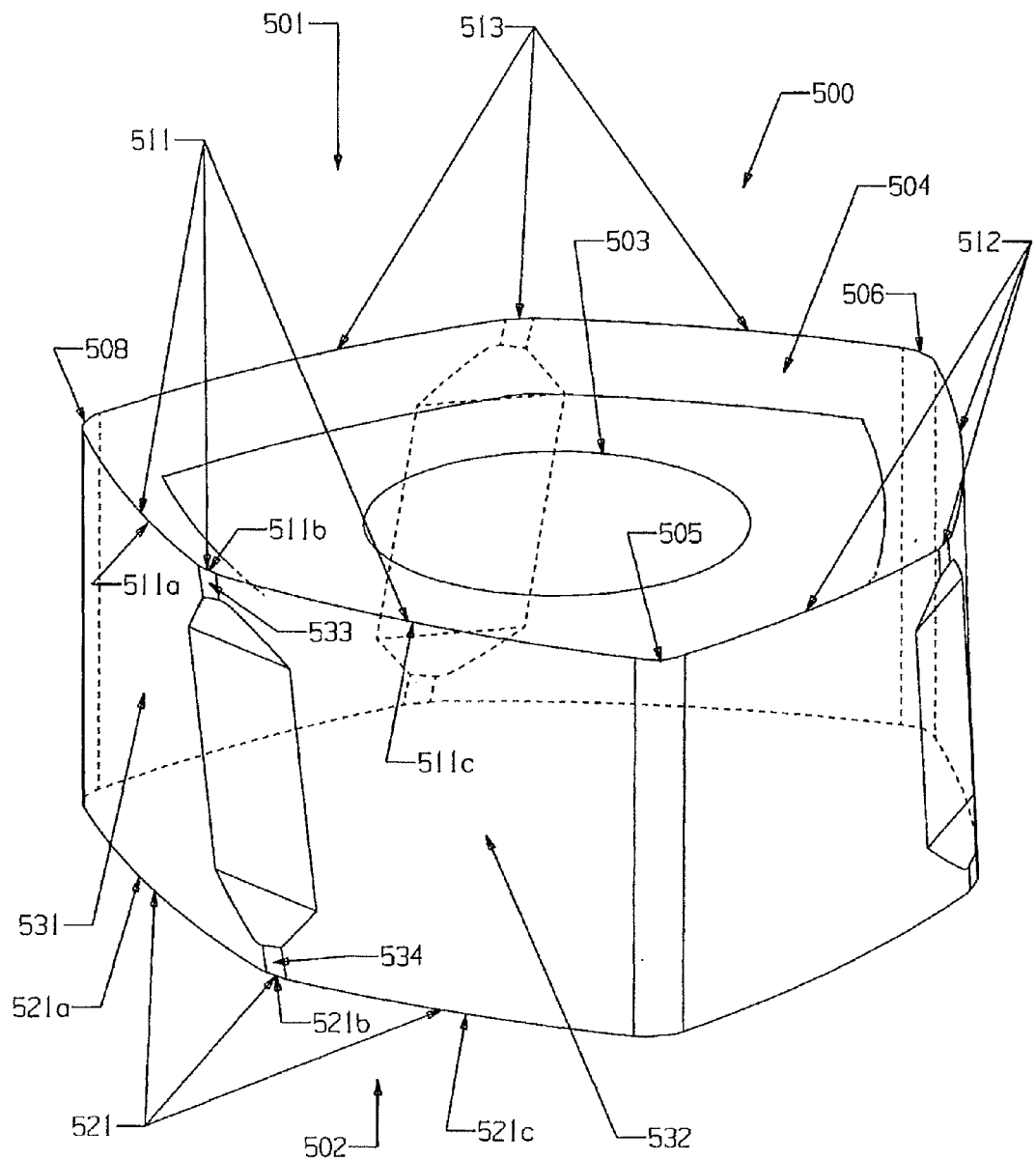
Figure 13B:
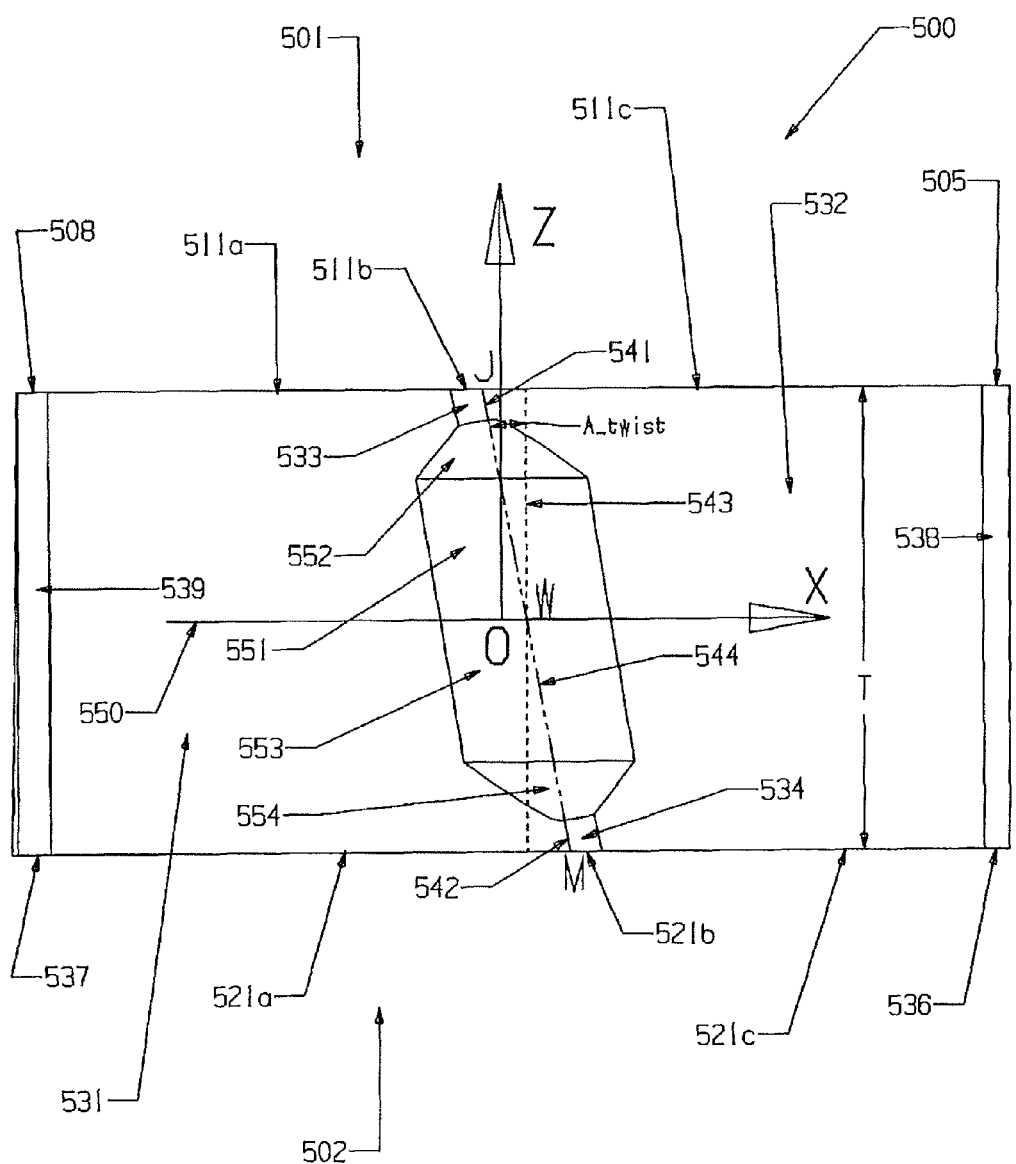

FIGS. 13(a)-13(c) illustrate a further embodiment with reference to FIGS. 12(a)-12(c) of a double-sided cutting insert having four sets of cutting edges per side.

Figure 14:
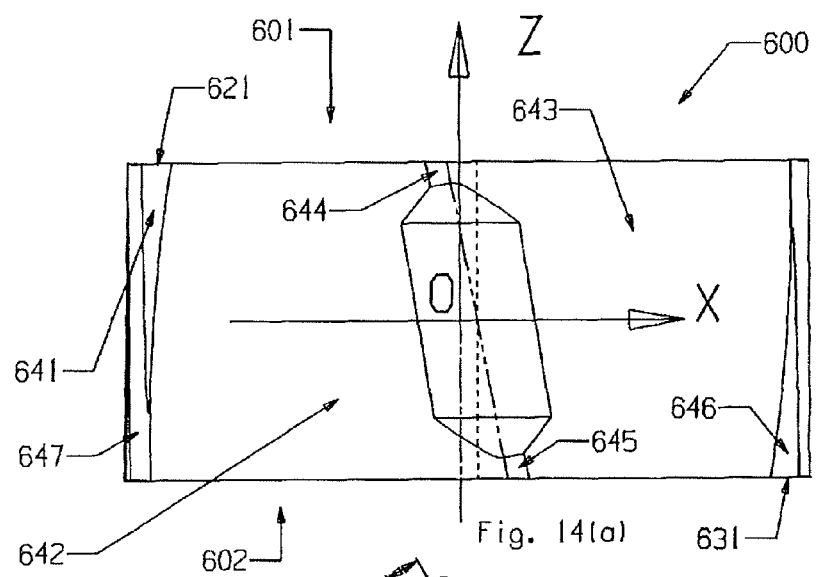
Figure 14:
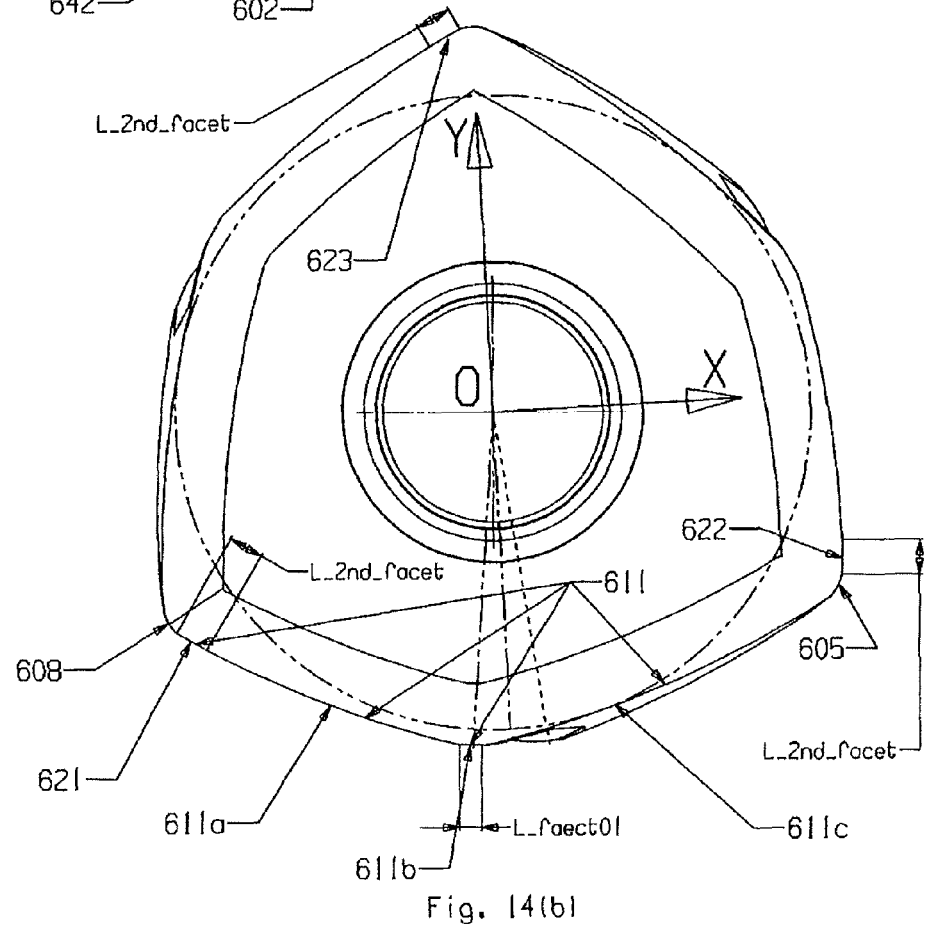

FIGS. 14(a)-(b) further illustrate another embodiment of a double-sided high feed milling inserts.

DESCRIPTION OF CERTAIN EMBODIMENTS

It is to be understood that certain descriptions of the present disclosure herein have been simplified to illustrate only those elements and limitations that are relevant to a clear understanding of the present disclosure, while eliminating, for purposes of clarity, other elements. Those of ordinary skill in the art, upon considering the present description of the disclosure, will recognize that other elements and/or limitations may be desirable in order to implement the present disclosure. However, because such other elements and/or limitations may be readily ascertained by one of ordinary skill upon considering the present description, and are not necessary for a complete understanding of the present disclosure, a discussion of such elements and limitations is not provided herein. For example, as discussed herein, embodiments of the cutting inserts of the present disclosure may be produced in the form of face milling inserts and other inserts for materials cutting. The methods by which cutting inserts are manufactured are generally understood by those of ordinary skill in the art and, accordingly, are not described in detail herein. In addition, all the geometric shapes should be considered to be modified by the term "substantially" wherein the term "substantially" means that the shape is formed within typical design and manufacturing tolerances for cutting inserts.

Furthermore, certain embodiments of the double-sided cutting inserts according to the present disclosure are disclosed in the form of face milling cutting inserts. It will be understood, however, that the double-sided cutting inserts may be embodied in forms, and applied to end uses, that are not specifically and expressly described herein. For example, one skilled in the art will appreciate that embodiments of the double-sided cutting inserts may be manufactured as cutting inserts for other methods of removing metal from work pieces.

Certain embodiments of the present disclosure are directed to double-sided cutting inserts, including double-sided single-handed inserts, which provide an increased number of indexable cutting edges. Moreover, each cutting edge can be configured to provide a combination of advantages exhibited by round-shaped cutting inserts having a very large radius, and square-shaped inserts of conventional size adapted for conventional use in a variety of milling and/or machining applications.

Figure 2:
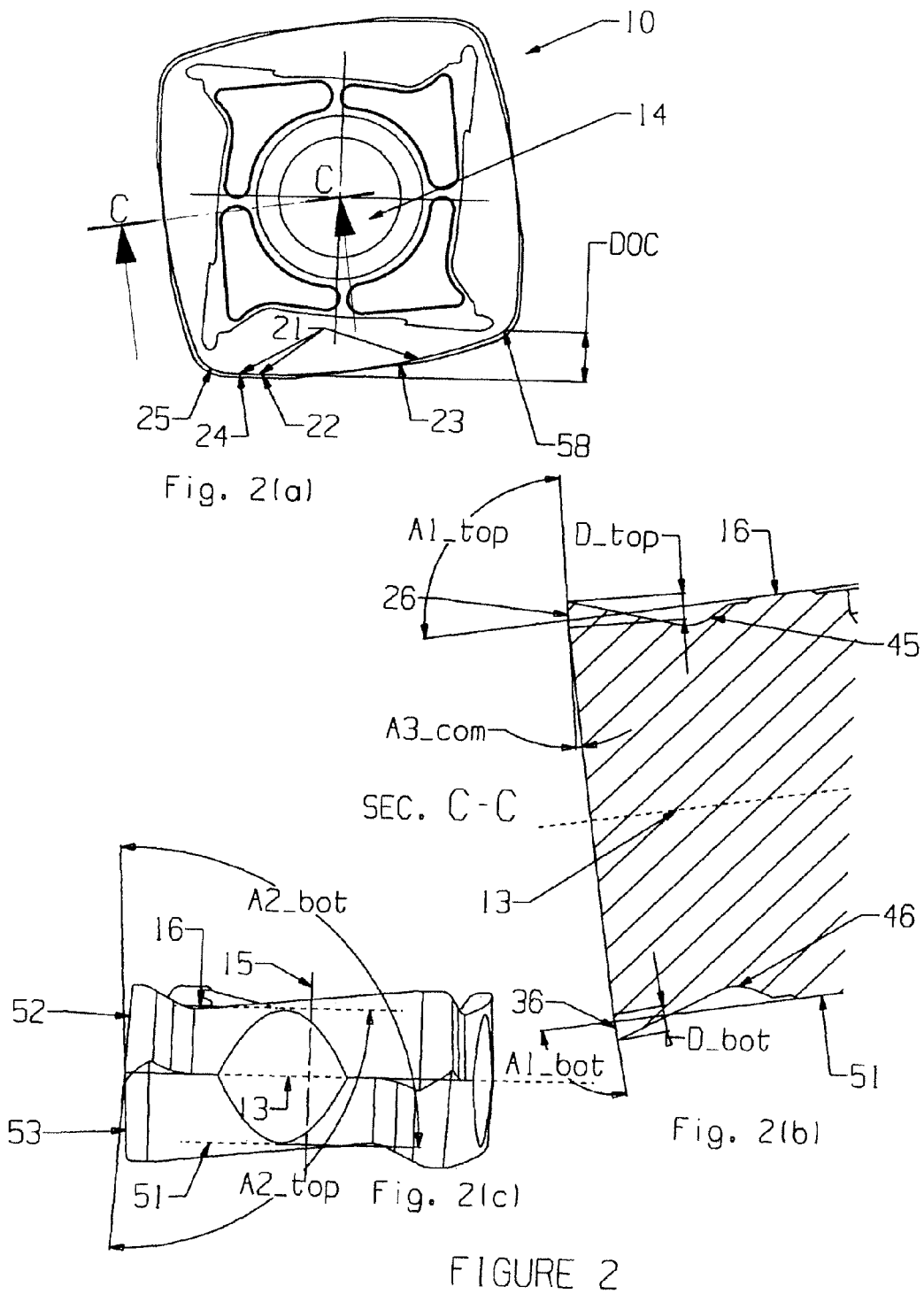

Referring now to FIGS. 1 and 2, and particularly the perspective view in FIG. 1, an embodiment of a double-sided cutting insert 10 having a plurality of indexable cutting edges, eight as shown in these figures, which can comprise: a top face 11 and a bottom face 12 separated by a virtual middle plane 13; at least three convex cutting edges 21, 31 on each of the top 11 and bottom 12 faces, each convex cutting edge 21, 31 having at least a curved cutting edge region 22, 32; at least three nose corners 25, 35 on each of the top 11 and bottom 12 faces, each nose corner 25, 35 connecting two of the convex cutting edges 21, 31; at least three peripheral side surfaces 19, 20 extending from each of the top 11 and bottom 12 faces to the virtual middle plane 13; and at least three lateral seating surfaces 41, each lateral seating surface 41 being formed on an adjacent pair of peripheral side surfaces 19, 20 of the top 11 and bottom 12 faces, such that each lateral seating surface 41 defines a common lateral seating surface for both the top 11 and bottom 12 faces. Each peripheral side surface 19, 20 can comprise a primary conical peripheral surface 26, 36 extending from a curved cutting edge region 22, 32 toward the virtual middle plane 13, and a secondary conical peripheral surface 29, 39 extending from a nose corner 25, 35 toward the virtual middle plane 13. In the context of the drawings, and for purposes of this description, the term "face," as used in regard to the "top face 11" and the "bottom face 12," can refer generally to the top "half," or "portion," and the bottom "half," or "portion," of the double-sided cutting insert 10.

Figure 11:
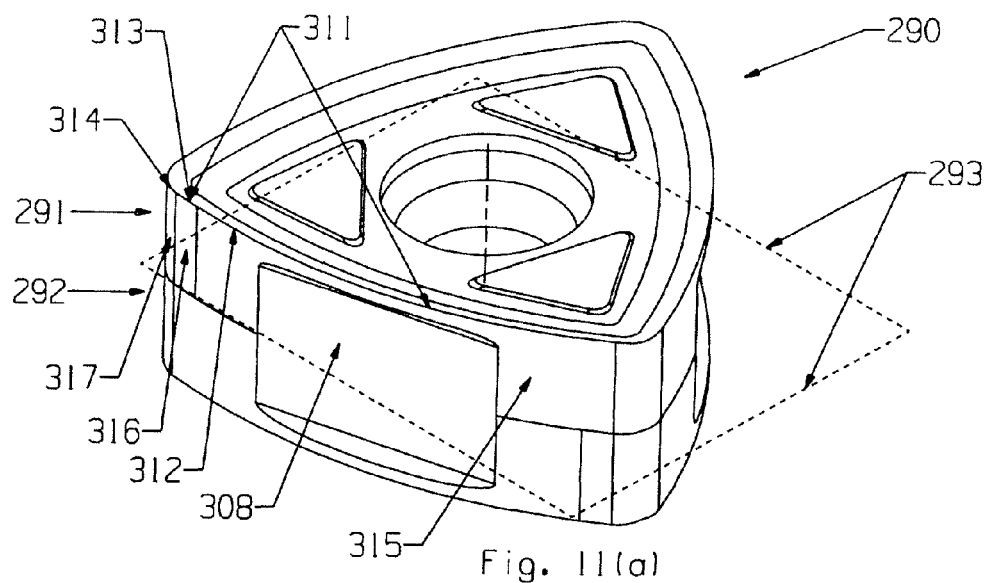
Figure 11:
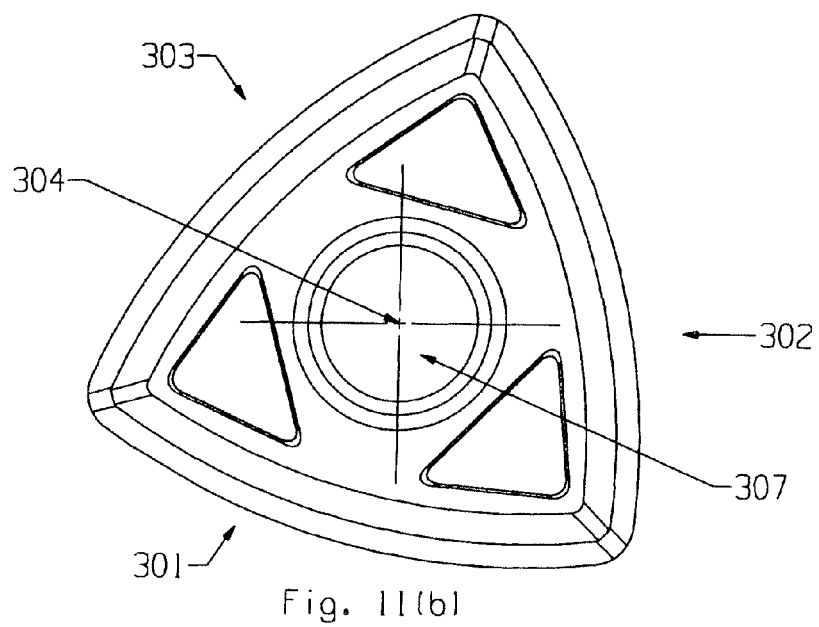

Moreover, although the double-sided cutting insert is shown being generally rectangular in shape having four "sides," it is to be understood that the double-sided cutting insert 10 could also be triangular shaped, having three sides, or could be otherwise shaped, having five or more sides, as will be described hereinafter in connection with FIGS. 9-11.

In certain embodiments, the bottom face 12 is a mirror image of the top face 11 about the virtual middle plane 13, such that the top 11 and bottom 12 faces are not "single-handed" in the same direction (refer to FIGS. 6 and 7 described in more detail hereinafter). There can also be chip breaking geometry 45, 46 provided on each of the top 11 and bottom 12 faces. In certain other embodiments, even where the top and bottom faces are not twisted relative to each other, the chip breaking geometry can be such that the top and bottom faces are still single-handed in the same direction (refer to FIG. 5 which is described in more detail hereinafter).

Furthermore, each convex cutting edge 21, 31 can be provided with a primary substantially straight cutting edge region 23, 33, provided intermediate the curved cutting edge region 22, 32 and the nose corner 25, 35, and each peripheral side surface 19, 20 can have a primary planar facet 27, 37 extending from the primary substantially straight cutting edge 23, 33 toward the virtual middle plane 13. The primary substantially straight cutting edge 23, 33 (sometimes referred to as a "wiper"), together with the associated primary planar facet 27, 37 functions to improve the surface finish of the machined workpiece. Additionally, each convex cutting edge 21, 31 can also have a secondary substantially straight cutting edge region 24, 34, provided intermediate the primary substantially straight cutting edge region 23, 33 and the nose corner 25, 35, and each peripheral side surface 19, 20 can have a secondary planar facet 28, 38 extending from the secondary substantially straight cutting edge 24, 34 toward the virtual middle plane 13. The secondary substantially straight cutting edge region 24, 34, together with the associated secondary planar facet 28, 38 can provide clearance for the primary substantially straight cutting edge region 23, 33 and associated primary planar facet 27, 37.

In embodiments having at least a primary substantially straight cutting edge region 23, 33, each of the top 11 and bottom 12 faces can be "twisted", i.e., rotated relative to each other, such that each of the top 11 and bottom 12 faces can be single-handed in same direction. In this case, the top 11 and bottom 12 faces will not be a mirror image of each other about the virtual middle plane 13.

Each primary conical peripheral surface 26 associated with the top face 11 can extend outwardly and toward the virtual middle plane 13 at a first angle relative thereto, and each primary conical peripheral surface 36 associated with the bottom face 12 can similarly extend outwardly and toward the virtual middle plane 13, at the same first angle, relative to the virtual middle plane 13, as the conical peripheral surface 26 associated with the top face 11.

As one of ordinary skill in the art understands, the conical peripheral surfaces result from curved features on the faces of the inserts. For example, the curved cutting edge regions result in associated conical peripheral surfaces, i.e., the aforementioned primary conical peripheral surface. Likewise, the nose corners, which also defining curved edges on the top face, also result in conical peripheral surface, i.e., the secondary conical peripheral surfaces. In contrast, where a substantially straight "cutting edge" is provided, such as the primary substantially straight cutting edge regions, the planar peripheral surfaces, or "facets," i.e., the aforementioned primary planar facets, are also created as clearance surfaces for the associated substantially straight cutting edge regions. It is generally understood that "curved" lines, e.g., cutting edges, can consist of a series of small straight line segments. However, as will be understood by one of ordinary skill in the art, the "substantially straight cutting edge regions" described herein are separate cutting edge regions, or portions, of the overall convex cutting edge. Thus, the "substantially straight cutting edge regions" are not merely a part or "segment" of the "curved" cutting edge region," but are a separate and distinct portion of the overall convex cutting edge. This is further made clear by the fact that each substantially straight cutting edge region described herein has a planar clearance surface, e.g., planar facet, associated therewith, and not a conical peripheral surface (as are associated with the curved cutting edge regions). The primary and secondary planar facets impart, respectively, a wiper function to the primary substantially straight cutting edge region 23, 33, and provide clearance for the secondary substantially straight cutting edge region 27, 37. The "planar facet" may also be referred to alternatively as a "planar clearance surface."

Additionally, the curved cutting edge regions and the substantially straight cutting edge regions, as described herein, are "curved" or "substantially straight" as viewed from above, i.e., in "top" views, as depicted in FIGS. 2(*a*), 3(*a*), 4(*a*), 5(*b*), 9(*b*), 10(*b*) and 11(*b*).

Each common lateral seating surface 41 can be formed by truncating portions of adjacent pairs of peripheral side surfaces 19, 20, i.e., adjacent pairs being the peripheral side surfaces 19, 20 of the top 11 and bottom 12 faces which are extending toward each other on the same side of the cutting insert 10. In particular, as described above, each peripheral side surface 19, 20 on both the top 11 and bottom 12 faces extends toward the virtual middle plane 13, i.e., each peripheral side surface 19 on the top face 11 extends towards an "adjacent" peripheral side surface 20 on the bottom face 12, on respective sides of the cutting insert 10. Consequently, the peripheral side surfaces 19 on the top face 11 and the peripheral side surfaces 20 on the bottom face 12 will meet, i.e., intersect, each other at the virtual middle plane 13. Each common lateral seating surface 41 can be created, or formed, by truncating, e.g., by grinding flat, the peripheral side surfaces 19, 20 at the intersection of such adjacent ones thereof. As shown in the drawing figures, each of the common lateral seating surfaces 41 can be terminated short of each the curved cutting edge regions 22, 32 on each of the top 11 and bottom 12 faces of the cutting insert 10. In other words, the intersecting peripheral side surfaces 19, 20 are ground flat beginning at the virtual middle plane 13 and extending outwards toward the convex cutting edges 21, 31 on each of the top 11 and bottom 12 faces. However, the grinding can be terminated at a certain depth so that the lateral seating surfaces 41 do not extend entirely to the convex cutting edges 21, 31. Alternatively, the lateral seating surfaces 41 could be extended entirely to the convex cutting edges 21, 31 if it were so desired.

One or more, and typically four, plateaus 16 can be provided, on each of the top 11 and bottom 12 faces, although the plateaus are shown only on the top surface 11 for purposes of this description. Each plateau 16 can be flat and can define a plane which is generally perpendicular to a central axis 15 of a through-hole 14 which is used to secure the cutting insert 10 in a cutter insert pocket, as described more fully hereinafter in connection with FIGS. 8 and 9. Each common lateral seating surface 41 can be generally perpendicular to the flat plateaus 16. Each nose corner 25, 35 can comprise one or more of a circular arc, a series of circular arcs, and a multi-segment spline curve, and each curved cutting edge region 22, 32 can have a radius which is at least two times the radius of the largest circle that may be inscribed on the top 11 or bottom 12 face of the double-sided cutting insert 10. In certain embodiments, each curved cutting edge region 22, 32 can have a radius which is at least four times the radius of the largest circle that may be inscribed on the top 11 or bottom 12 face of the double-sided cutting insert 10. Each curved cutting edge region 22, 32 can comprise one or more of a portion of an ellipse, a portion of a parabola, and a multi-segment spline curve.

The virtual middle plane 13 will generally be located at the half thickness of the cutting insert 10. Both the top face 11 and the bottom face 12 can comprise the same face geometry and periphery. As shown in FIG. 1, both faces 11, 12 are single-handed, and are twisted, i.e., rotated, relative to each other. The "twisted" (i.e., rotated) face geometry between the top face 11 and the bottom face 12 results because each face of the cutting insert is desired to be single-handed. In many milling applications, each of cutting edges is fully engaged in cutting, and in some cases, for example as embodiments shown in FIGS. 1-4, there are a number of features associated with both the convex cutting edges and the clearance surfaces for each of the set of cutting edges thereof on each face of the double-sided insert 10.

A through hole 14 with a central axis 15 perpendicular to the virtual middle plane 13, and the flat plateaus 16, can be provided for securing the insert in a tool holder. As shown, each face 11, 12 of the double-sided cutting insert 10 can have four sets of convex cutting edges, which can be identical, and each one is connected by a nose corned 25. Using just the top face 11 as an example, each of the convex cutting edges 21 comprises a curved cutting edge region 22 having a large radius, a primary substantially straight cutting edge region 23, and a secondary substantially straight cutting edge 24, which is optional. In regard to both of the substantially straight cutting edge regions described above, and as described in connection with other figures hereinafter, the term "straight" means straight as viewed along the central axis 15. Each of the convex cutting edges 21 can have an associated peripheral side surface 19 which extends towards the virtual middle plane 13 in an outwardly angled direction. The peripheral side surfaces 19 can angle outwardly at an angle greater than 90 degrees relative to the virtual middle plane 13, and/or the flat plateau 16 which is generally parallel to the virtual middle plane 13. Each outwardly angled peripheral side surface 19 can be comprised of a primary conical peripheral surface 26 associated with the curved cutting edge region 22, a primary planar facet 27 associated with the primary substantially straight cutting edge region 23, an optional secondary planar facet 28 associated with the optional secondary substantially straight cutting edge region 24, and a secondary conical peripheral surface 29 associated with the nose corner 25.

Similarly, on the bottom face 12 there can also be four identical convex cutting edges 31, each one connected by a nose corner 25. Each convex cutting edge can comprise a curved cutting edge region 32 having a large radius, a primary substantially straight cutting edge region 33, and an optional secondary substantially straight cutting edge region 34. Also, just as for the top face 11, each convex cutting edge 31 can be associated with a peripheral side surface 20 which extends towards the virtual middle plane 13 in an outwardly angled direction. Like the peripheral side surfaces 19 associated with the top surface 11, the peripheral side surfaces 20 can angle outwardly at an angle greater than 90 degrees relative to the virtual middle plane 13, and/or the flat plateau 16 which is generally parallel to the virtual middle plane 13. Likewise, each outwardly angled peripheral side surface 19 can be comprised of a primary conical peripheral surface 36 associated with the curved cutting edge region 31, a primary planar facet 37 associated with the primary substantially straight cutting edge region 33, an optional secondary planar facet 38 associated with the optional secondary substantially straight cutting edge region 34, and a secondary conical peripheral surface 39 associated with the nose corner 35.

As can be seen in FIGS. 1 and 2, the peripheral side surfaces 19, 20 associated with the top 11 and bottom 12 faces of the insert 10 are not simple mirror images about the virtual middle plane 13. Rather, the peripheral side surfaces 19 associated with top face 11 are twisted, i.e., rotated, relative to the peripheral side surfaces 20 associated with the bottom face 12, in order to account for the desired single-handed cutting direction in the milling operations.

More particularly, the lateral seating surface 41 can be created on each of the peripheral side surfaces 19, 20 by truncating, in a direction perpendicular to the virtual middle plane 13, or the flat plateau 16, two adjacent primary conical peripheral surfaces 26, 36 on each of the peripheral side surfaces of the top 11 and bottom 12 faces of the insert 10. As shown, the common lateral seating surface 41 is terminated short of each curved cutting edge region 22, 32 on each face 11, 12 of the cutting insert 10. However, the lateral seating surface could alternatively be extended to the convex cutting edges 21, 31 if desired.

As will be described hereinafter, the various geometric features on each face 11, 12 of the insert 10 are arranged in a certain order, from "start" to "finish." For example, referring to the embodiment of the insert 10 shown in FIG. 1, for example, both the top face 11 and the bottom face 12 can have an equal number of convex cutting edges 22 connected by nose corners 25. These features can "start" with, e.g., a first/respective nose corner 25 followed by a respective primary substantially straight cutting edge region 23, and lastly a respective curved cutting edge region 22 having the large radius. Where it is provided, a respective second substantially straight cutting edge region 24 is provided between the first substantially straight cutting edge region 23 and the nose corner 25. Correspondingly, each face 11, 12 of the insert 10 has the aforesaid peripheral side surfaces 19, 20, including conical surfaces and planar facets, associated with the convex cutting edges 21, 31, including the curved cutting edge regions 22, 32 and any substantially straight cutting edge regions 23, 33 and 24, 34. In view of FIG. 1 for example, and just in regard to the top surface 11, the peripheral side surfaces 19 can comprise, in order, the conical clearance surfaces 29 associated with the nose corners 25, followed by the primary planar facet 27 associated with the primary substantially straight cutting edge regions 23, followed by the primary conical clearance faces 26 associated with the curved cutting edge regions 22. Where the second substantially straight cutting edge regions 24 are provided, the second planar facets 28 associated therewith can be provided intermediate the conical clearance faces 29 and the first planar facets 27. The peripheral side surfaces 19, 20 associated with each of the top 11 and bottom 12 faces can share a single, common lateral seating surface 41.

Figure 5:
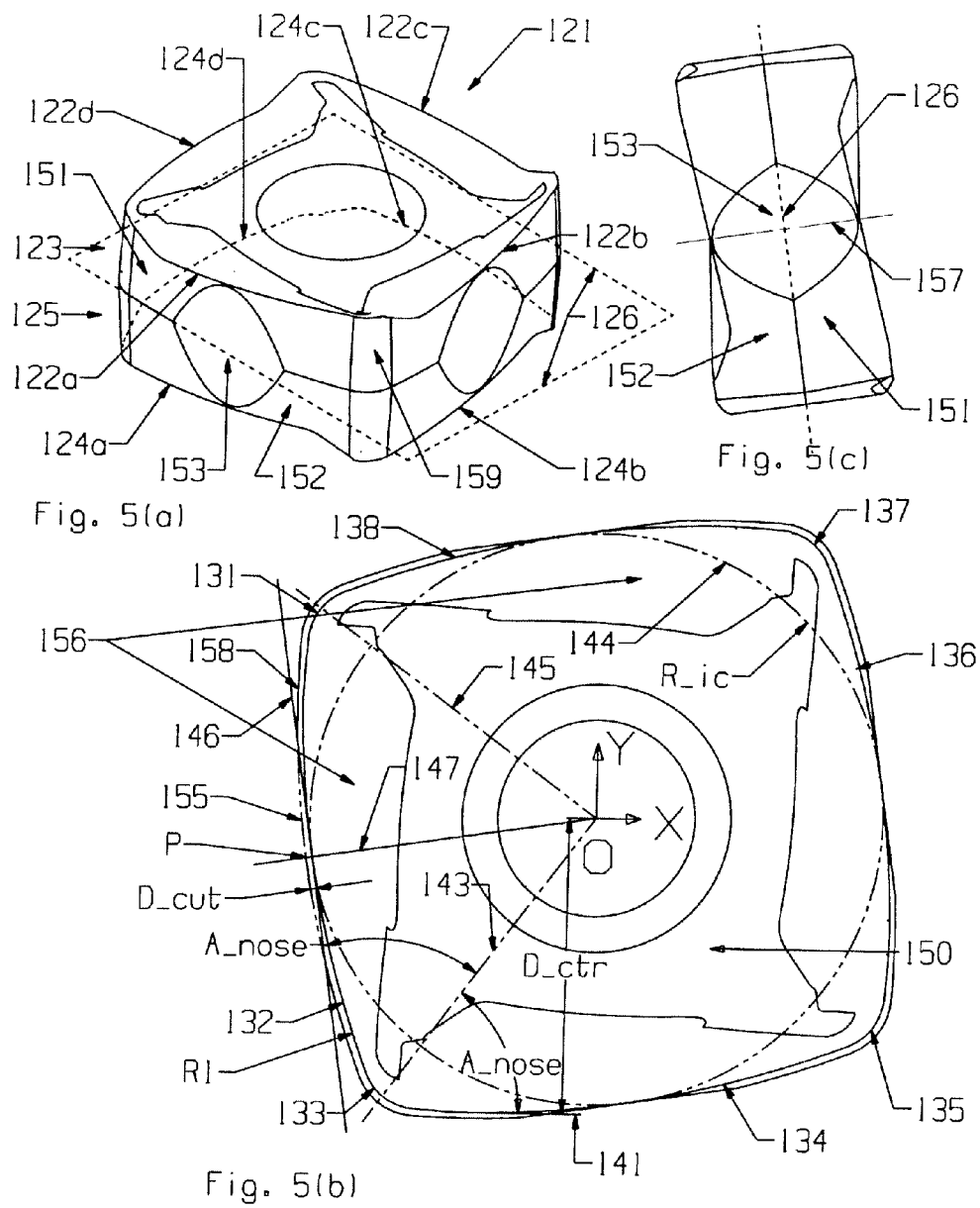

The chip groove geometry 45, 46, which can be provided on each side of the insert, can vary between each nose corner 25, 35. More particularly, the chip groove geometry 45, 46 can change from one "end" (i.e., close to one nose corner 25, 35) to another "end" (i.e., close to the next nose corner 25, 35). Moreover, different chip groove geometry can also result in the convex cutting edges 21, 31 having a "wavy" configuration, as observed from a side view, as illustrated in FIGS. 5 and 7, for example.

Turning more particularly to FIGS. 2(a) through 2(c), further details of single-handed double-sided cutting insert 10 are shown, in which FIG. 2(a) is a top view, FIG. 2(b) is a section view along line C-C which passes through the center of the screw hole 14 and is perpendicular to a common lateral seating surface 41, and FIG. 2(c) is a side view. As shown, the convex cutting edge 21 can comprise a curved cutting edge region 22, a primary substantially straight cutting edge region 23, an optional secondary substantially straight cutting edge region 24 and a nose corner 25. In FIG. 2(a) the insert 10 is illustrated positioned in the same manner as if the insert 10 were held in a tool holder for a machining operation, in which the primary substantially straight cutting edge region 23 is positioned perpendicular to a cutting axis on a tool holder (refer to FIGS. 8 and 9). The primary substantially straight cutting edge region 23 is aligned in this manner, relative to the surface of a work piece being operated upon, in order to improve the surface finish on the work piece. As also illustrated, the maximum depth of cut "DOC" in a milling operation will occur at point 58, on the nose corner 25 at the other side of the curved cutting region 22 which is contacting the work piece. The cutting insert 10 configured as shown in FIGS. 1 and 2 is designed to only move in a single direction, and is thus referred to as being a single-handed cutting insert.

Referring to FIG. 2(b), an angle A1_top can be defined between the virtual middle plane 13, or a flat plateau 16 on the top face 11 of the cutting insert 10, and the primary conical peripheral surface 26. The distance between the curved cutting edge region 22 on the top face 11 and the common lateral seating surface 41 can be defined as D_top. As previously described in connection with FIG. 1, each convex cutting edge 21 is associated with an outward-angled peripheral side surface comprising a primary conical peripheral surface 26, a primary planar facet 27, and an optional secondary planar facet 28. Additionally, a secondary conical peripheral surface 29 is associated with a nose corner 25. Each of these peripheral surfaces extend toward, and can terminate approximately at the virtual middle plane 13, which can be at a half thickness of the insert 10.

Turning to FIG. 2(c), an angle A2_top can be defined between the virtual middle plane 13, or the flat plateau 16 on the top face 11, and a surface 52, which can represent any of the above-mentioned surfaces 26, 27, 28 or 29 on the top face 11 of the cutting insert 10. Similarly, an angle A1_bot can be defined between the virtual middle plane 13, or a flat plateau 51 on the bottom face 12, and the primary conical peripheral surface 36. The distance between the curved cutting edge region 32 on the bottom face 12 of the cutting insert 10 and the common lateral seating surface 41 can be defined as D_bot. Additionally, an angle A2_bot can be defined between the virtual middle plane 13, or flat plateau 51, and a surface 53, which can represent, similarly to surface 52, any of the above-mentioned surfaces 36, 37, 38 or 39 on the bottom face 12 of the cutting insert 10.

Furthermore, an angle A3_com can be defined between a common lateral seating surface 41 and a primary conical peripheral surface 26 or 36, on either the top 11 or bottom 12 face of the cutting insert 10. Therefore, having set out the above-described definitions, the following equation (1) can be established to quantitatively describe the relationship between the related surfaces thus being used as a reference in geometry design:

$$\begin{cases} A1\_top \geq 90° \\ D\_top = D\_bot \\ A1\_top = A1\_bot \\ A2\_top = A2\_bot \\ A1\_top = A2\_top \\ A3\_com = A1\_top - 90° \end{cases} \quad (1)$$

One of the important features of the double-sided cutting insert 10 described herein is the common lateral seating surface 41. The purpose of such a common lateral seating surface is to enable double-sided cutting insert, and particularly a single-handed double-sided cutting insert with convex cutting edges and substantially conical dominated peripheral surfaces, to be properly secured in an insert pocket on a tool holder, while also providing all of the requisite positive cutting geometry in a milling operation. In order to mathematically work out how such a common lateral seating surface is created, it is useful to understand how the two sides of a single-handed and double-sided cutting insert are twisted, i.e., rotated, relative to each other.

Referring now to FIGS. 3(a) and 3(b), in which FIG. 3(a) is a top view and FIG. 3(b) is an enlarged detail view of section "B" in FIG. 3(a), a single-handed double-sided cutting insert 55 is illustrated. The outside curve 58 is the external profile at a virtual middle plane at generally the half thickness of the cutting insert 55. The cutting edge regions denoted 61 to 65 in solid lines are on the top face of the cutting insert 55. Cutting edge region 61 corresponds to a curved cutting edge region with a large radius R1_top which is greater than or equal to two times the radius R_ic of the inscribed circle 59 (on either the top or bottom face of cutting insert 55); cutting edge region 62 corresponds to a primary substantially straight cutting edge region (as seen in a top view) with a length of L1_top; cutting edge region 63 corresponds to an optional secondary substantially straight cutting edge region (also as seen in a top view) with a length of L2_top; cutting edge region 64 corresponds to a nose corner with a radius of R2_top; and cutting edge region 65 corresponds to a curved cutting edge region (same as the curved cutting edge region 61) which is connected to the other side of the nose corner 64. The cutting edge regions 61 to 63 thus can be understood to comprise one of the illustrated four identical convex cutting edges on the top face of the double-sided cutting insert 55. There is an offset angle A4_top between the primary substantially straight cutting edge region 61 and the optional secondary substantially straight cutting edge region 62. Such an offset angle A4_top can be provided to protect the nose corner 64 from contacting the workpiece surface which is perpendicular to a cutting axis of a tool holder.

Similarly to the top face of the cutting insert 55, cutting edge regions 71 to 75 in dotted lines are on the bottom face of the cutting insert 55. Cutting edge region 71 corresponds to a curved cutting edge region having a radius R1_bot which is greater than or equal to two times the radius R_ic of the inscribed circle 59; cutting edge region 72 corresponds to a primary substantially straight cutting edge region with a length of L1_bot; cutting edge region 73 corresponds to an optional secondary substantially straight cutting edge region with a length of L2_bot; cutting edge region 74 corresponds to a nose corner with a radius of R2_bot; and cutting edge region 75 corresponds to a curved cutting edge region (same as the curved cutting edge region 71) which is connected to the other side of the nose corner 74. The cutting edge regions 71 to 73 can thus be understood to comprise one of the illustrated four identical convex cutting edges on the bottom face 12 of the double-sided cutting insert 55. There is also an offset angle A4_bot, as described-above for the top face, provided between the primary substantially straight cutting edge region 71 and the optional secondary substantially straight cutting edge region 72.

The quantitative relationship among the parameters as above described can be expressed by the following equation (2):

$$\begin{cases} R1\_top = R1\_bot \\ L1\_top = L1\_bot \\ L2\_top = L2\_bot \\ R2\_top = R2\_bot \\ A4\_top = A4\_bot \\ R1\_top \geq 2 * R\_ic \\ 0 < A4\_top \leq 5° \end{cases} \quad (2)$$

It is clear from the figures, particularly FIG. 3(b), that the top face of the cutting insert 55 is twisted, i.e., rotated, relative to the bottom face of the cutting insert 55. This twist is relative to a virtual nose center line 57 which passes through the center of the inscribed circle 59 and a virtual nose center 70 as if the top and bottom faces were not twisted due to the single-sided effect.

As the next step to further quantitatively describe a single-handed double-sided cutting insert having convex cutting edges with big radius, a mathematical relationship can be derived between the single-handed geometry from both faces of the cutting insert and the common lateral seating surfaces.

Turning to FIGS. 4(a) through 4(c), an embodiment of a single-handed double-sided cutting insert 81 for high feed milling is shown, in which FIG. 4(a) is a top view of the cutting insert 81 having an inscribed circle 82 and a screw hole 83 which is coincident with the inscribed circle 82, FIG. 4(c) is an enlarged detail view of "D" from FIG. 4(a), and FIG. 4(b) is a projected side view following the direction along the line PO 84 in FIG. 4(c). In FIG. 4(c), where some non-relevant lines are removed for easy clarification, the top convex cutting edge 90 in solid lines comprises an optional secondary substantially straight cutting edge region 93 connected to the nose corner 92, a primary substantially straight cutting edge region 94 following the optional secondary substantially straight cutting edge region 93, and a curved edge region 95 connected between the primary substantially straight cutting edge region 94 and the next nose corner. Similarly, on the same portion shown in FIG. 4(c), but at the bottom face of the cutting insert 81, the bottom convex cutting edge 100 in dashed lines comprises an optional secondary substantially straight cutting edge region 103 connected to the nose corner 102, a primary substantially straight cutting edge region 104 following the optional substantially straight cutting edge region 103, and a curved edge region 105 connected between the primary substantially straight cutting edge region 104 and the next nose corner 106.

As also shown in FIG. 4(c), an XOY coordinate system is established with the origin "O" at the center of the inscribed circle 82. The "Y" axis represents the cutting axis of a milling cutter, and the "X" axis is parallel to the work piece surface being machined. Thus, if the cutting insert 81 is mounted in an insert pocket of a milling cutter, a primary substantially straight cutting edge region 111, previously defined as L1_top in FIG. 3, will extend in a direction perpendicular to the "Y" axis, i.e., the cutting axis of the milling cutter. Since the four identical convex cutting edges shown on the top face of the cutting insert 81 are indexable about the center of the inscribed circle 82, the perpendicular distance defined by D_ctr_top1 (as seen in FIG. 4(c)) from the center "O" to a primary substantially straight cutting edge region 111 must be equal to the similar perpendicular distance defined by D_ctr_top2 (also as seen in FIG. 4(c)) from the center "O" to a primary substantially straight cutting edge region 94, which can be mathematically described by the following equation (3):

$$\begin{cases} (D\_ctr\_top)_i = (D\_ctr\_top)_{i+1}, & i = 1, 2, 3 \\ (L1\_top)_i = (L1\_top)_{i+1}, & i = 1, 2, 3 \end{cases} \quad (3)$$

In the preceding equation, D_ctr_top is mainly determined by design parameters like the radius of a curved cutting edge region R1_top, the radius of the inscribed circle R_ic, and the length of a primary substantially straight cutting edge region L1_top, as well as the number of convex cutting edges, which are four in the embodiments described herein. Similarly a primary substantially straight cutting edge region 104, defined as L1_bot, with a perpendicular distance to the center "O" being defined as D_ctr_bot, shown in FIG. 4(c), will satisfy a similar mathematical relationship as below:

$$\begin{cases} (D\_ctr\_bot)_i = (D\_ctr\_bot)_{i+1}, & i = 1, 2, 3 \\ (L1\_bot)_i = (L1\_bot)_{i+1}, & i = 1, 2, 3 \end{cases} \quad (4)$$

Figure 3:
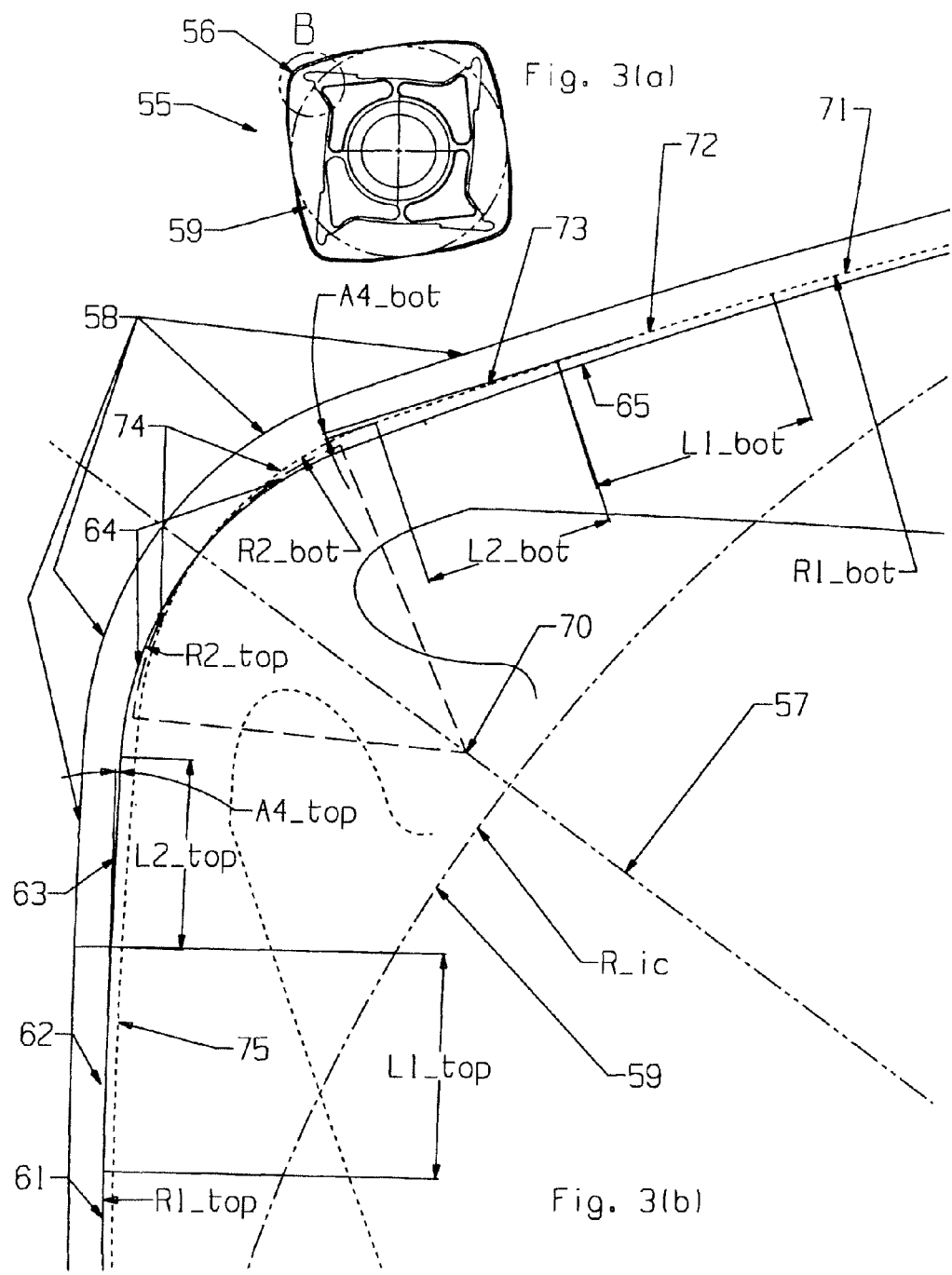

Further, as already discussed in connection with FIG. 3, there is a virtual nose center line 57 passing through the center of an inscribed circle 59 and a virtual nose center 70, as if the top and bottom face were not twisted due to the single-sided effect. There are four such virtual nose center lines, one at each nose corner, as shown in FIG. 4(c), for the virtual nose center lines 113 and 114 which are angled at 90 degrees to each other due to there being four sets of identical convex cutting edges on each side of the cutting insert 81 in the embodiment illustrated. Therefore, the angle A_nose_top on the top face 11, between a primary substantially straight cutting edge region 111 and a virtual nose center line 114, should be equal to the angle A_nose_bot on the bottom face 12, between a primary substantially straight cutting edge region 104 and a virtual nose center line 114. In addition, it is clear that D_ctr_top and D_ctr_bot are equal to each other. Thus, the following expression can be derived:

$$\begin{cases} (A\_nose\_top)_i = (A\_nose\_bot)_i, & i = 1, \dots, 4 \\ (D\_ctr\_top)_i = (D\_ctr\_bot)_i, & i = 1, \dots, 4 \end{cases} \quad (5)$$

Once equations (3) through (5) for the single-handed double-sided cutting insert 81 are established, the location and orientation of both a primary substantially straight cutting edge region 94 on the top face 11, and a primary substantially straight cutting edge region 104 on the bottom face 12 can be determined. Next, a line 97 can be introduced by extending a top primary substantially straight cutting edge region 94, and a line 107 can be introduced by extending a bottom primary substantially straight cutting edge region 104. The two lines 97 and 107 intersect at a point "P." A third line 84 can be drawn from point "P" to center point "O," which is the center of the inscribed circle 82, but which also serves as the rotating point of the four indexable convex cutting edges, on both the top and bottom faces. Then, from the angular relations illustrated in FIG. 4(c), using the angle A_nose_top between the lines 97 and 113 as reference, the following equation can be obtained to define the line PO in the XOY coordinate system:

$$Y = \tan(A\_nose\_top - \pi/4) * X \quad (6)$$

Thereafter, the equation for the line 116, which is perpendicular to line 84, can be expressed by the following equation (7):

$$X*\cos(A\_nose\_top-\pi/4)+Y*\sin(A\_nose\_top-\pi/4)+\overline{PO}-D\_cut=0 \quad (7)$$

where $\overline{PO}=D\_ctr\_top/\cos(A\_nose\_top-\pi/4)$ and $$D\_cut=D\_top*\sin(A3\_com)$$

Thus, line 116 can be used to construct a plane that is perpendicular to a virtual middle plane, or a flat plateau. This plane can be used to truncate the primary conical peripheral surfaces 122 and 123 on the top and bottom faces, to create the common lateral seating surface 121, as shown in FIG. 4(b). Such a lateral seating surface serves as a common seating surface for both the single-sided top face geometry and the singled-sided bottom face geometry, even though both are twisted relative to each other.

A further embodiment of a single-handed double-sided indexable cutting insert 121 is shown in FIGS. 5(a) through 5(c), in which FIG. 5(a) is a perspective view, 5(b) is an enlarged top view, and 5(c) is a side view. As shown, the double-sided cutting insert 121 can have four convex cutting edges 122a to 122d on the top face 123, and four convex cutting edges 124a to 124d on the bottom face 125. Each of the convex cutting edges on both the top 123 and bottom 125 faces can be identical. Each of the convex cutting edges on the top face 123 can be connected by nose corners 131, 133, 135, and 138. Although not shown, each of the convex cutting edges on the bottom face 125 can also be connected by nose corners. The top face 123 and the bottom face 125 are separated by a virtual middle plane 126, which can be at a half thickness of the cutting insert 121. In this embodiment of the cutting insert 121, each of the convex cutting edges 122a to 122d can comprise simply a curved cutting edge region 132, 134, 136, 138 without any of the substantially straight cutting edge regions described in previous embodiments.

It can be assumed there is a virtual primary straight line 141 which can functions the same as the primary substantially straight cutting edge region 23 in FIG. 2(a), or the primary substantially straight cutting edge region 111 in FIG. 4(c). When the double-sided cutting insert 121 is positioned as shown in FIG. 5(b), as it would be positioned in a tool holder for an actual milling operation, similar to that illustrated in FIG. 2(a), or FIG. 4(c), the virtual primary straight line 141 is thus perpendicular to the "Y" axis (i.e., the cutting axis in a tool holder). Since each convex cutting edge 122a-122d only comprises a curved cutting edge region 132, 134, 136,138, the cutting insert 121 can be double-sided cutting insert without any twist between the top 123 and bottom 125 faces. This is because, first, the convex cutting edges do not comprise any substantially straight cutting edge regions near a nose corner; and second, the nose corner center line 143, which passes through both the center of the nose corner 133 and the center of the inscribed circle 144, is no longer a "virtual" nose center line, like line 114 in FIG. 4(c). This similarly applies for the nose center line 145 which passes through both the center of the nose corner 131 and the center of the inscribed circle 144. As a result, a line 146, shown in FIG. 5(b), can be introduced which is perpendicular to the center line 147 (of a curved cutting edge region 132) that passes through both the center of a curved cutting edge region 132 and the center of the inscribed circle 144. Based on such a line 146, a plane that is perpendicular to a virtual middle plane 126, or flat plateau 150, can be constructed and used to truncate the primary conical peripheral surfaces 151 and 152 on both the top and bottom faces to create the common lateral seating surface 153, as shown in FIGS. 5(a) and FIG. 5(b). The position of the common lateral seating surface 153 is determined by D_cut between the line 146 and the pre-cut external profile 155 which intersects with line 147 at point "P," as shown as phantom lines in FIG. 5(b).

As described previously, an insert designed as described in connection with FIGS. 1-4 permits the insert to be operated in only one direction, hence the designation "single-handed." However, for the embodiment shown in FIG. 5, for example, although the design of convex cutting edges and clearance surfaces is not single-handed, the chip groove geometry on the face of the insert still varies between two nose corners, such that this embodiment is still considered "single-handed."

Nevertheless, in this particular embodiment the insert does not have the "twisted" geometry between the top and bottom face as in prior embodiments.

As mentioned previously, the reason why the top side is "twisted" with respect to bottom side, e.g., for the embodiments shown in FIGS. 1-4, is that the top side geometry must be arranged in the opposite direction relative to the bottom side geometry so that when the insert is flipped over, to use the bottom side, the cutting edges will be oriented in the same cutting direction as were the cutting edges on the top side. Because the peripheral geometry between two nose corners is not symmetric vs. a virtual center plane between the two nose corners, the top and bottom peripheries are not coincident, or completely overlapped. Therefore, because the two curved cutting edge regions with large radius are coincident, the nose corner portions are "twisted" due to the non-symmetry of the entire cutting edge about a center plane between two nose corners.

Thus, the double-sided cutting insert 121 as shown in FIG. 5 is still a single-handed cutting insert because the chip breaker geometry 156 as shown in FIG. 5(b) is neither symmetric about a center line 147 nor a center line 145, and furthermore, because a resultant cutting edge like 122a is in a waved form and is not symmetric about a center line 157 as seen from a side view like FIG. 5(c). This may be regarded as a special case of the single-handed double side cutting insert as described in previous FIGS. 1 to 4. Thus all the previous equations (1)-(3) and (6)-(7) can be applied accordingly with some symbolic changes owing to the fact there is no difference between a top face 11 periphery and a bottom face 12 periphery, for instance, substituting A_nose for A_nose_top, D_ctr for D_ctr_top, R1 for R1_top, etc.

Additionally, similarly to the description presented in connection with FIGS. 1 to 4, the curved cutting edge region 132 can have a radius R1 greater than or equal to two times the radius R_ic of the inscribed circle 144 which is tangent to the external profile 158 at the virtual middle plane 126 of the cutting insert 121. Each convex cutting edge like 122a on the top face 123 forms an outward-angled peripheral surface comprising a primary conical peripheral surface 151 extended downward from a curved cutting edge region 132 towards the virtual middle plane 126 and a secondary conical peripheral surface 159 extended downward from a nose corner 133 towards the virtual middle plane 126. The same method can be applied to create a primary conical peripheral surface and a secondary conical peripheral surface at the bottom face 125. Therefore, the mathematical relationship in this special case can be rewritten into the following group equation (8).

$$\begin{cases} A1 \geq 90° \\ A3\_com = A1 - 90° \\ R1 \geq 2*R\_ic \\ 0 < A4 \leq 5° \\ (D\_ctr)_i = (D\_ctr)_{i+1}, i = 1, \ldots, 3 \\ (L1)_i = (L1)_{i+1}, i = 1, \ldots, 3 \\ Y = \tan(A\_nose - \pi/4)*X \\ X*\cos(A\_nose - \pi/4) + Y*\sin(A\_nose - \pi/4) + \overline{PO} - D\_cut = 0 \end{cases} \quad (8)$$

Referring next to the two further embodiments of double-sided cutting inserts shown in FIGS. 6 and 7, these inserts are not single-handed, but can be considered a "special case" of single-handed designs. In particular, all of the geometric features, e.g., the cutting edges, common lateral seat faces, clearance surfaces, and chip groove geometry, are symmetric relative to a virtual center plane between two nose corners. Consequently, these embodiments are "ambidextrous," and can be used in either direction in machining.

The two embodiments illustrated in FIGS. 6 and 7 are similar to the embodiment shown in FIG. 5, except having symmetrical chip breaker geometry and the resultant symmetrical cutting edges. Thus, both of these embodiments can also be considered as two "special cases" of single-handed double-sided cutting inserts. Moreover, both can be quantitatively described by the above group equation (8).

Turning to FIGS. 6(a) and 6(b), in which FIG. 6(a) is a perspective view and FIG. 6(b) is a side view, there is shown a double-sided cutting insert 161. The top face 162 and the bottom face 163 are merely a mirror image of each other about the virtual middle plane 164 at half thickness of the double-sided cutting insert 161. Using only the top face 162 as an example, the cutting insert 161 illustrated can comprise four convex cutting edges 165a to 165d connected by four nose corners 167a-167d. Each convex cutting edge 165a-165d can be identical, and can comprise only a curved cutting edge region 166a to 166d, each of which can have a radius greater than or equal to two times a radius of an inscribed circle. Each nose corner 167a-167d can also be identical. The geometrical features of the cutting insert 161 illustrated in FIG. 6(a) can be the same as corresponding geometrical features illustrated in FIGS. 5(a)-5(c), except that both the chip breaker geometry 168 and the convex cutting edges 165a-165d (being straight as seen from a side view) are symmetric about a center line 169, as shown in FIG. 6(b), which is created by projecting a view normal to a common lateral seating surface 170.

Similarly, FIGS. 7(a) and 7(b), in which FIG. 7(a) is a perspective view and FIG. 7(b) is a side view, illustrate a further embodiment of a double-sided cutting insert 171. The top face 172 and the bottom face 173 of this insert 171 are also mirror images of each other about the virtual middle plane 174. Using only the top face 172 as an example, the illustrated cutting insert 171 comprises four convex cutting edges 175a-175d, each of which can be identical, and each of which can comprise only a curved cutting edge region 176a-176d having a radius greater than or equal to two times a radius of an inscribed circle. Each convex cutting edge 175a-175d can be connected by nose corners 177a-177d, which can also be identical. The geometrical features of the cutting insert 171 can be the same as the corresponding features illustrated in FIGS. 5(a)-5(c), except that the both chip breaker geometry 178 and the convex cutting edges 175a-175d (being wavy as seen from a side view) are symmetric about a center line 179, as shown in FIG. 7(b) which is created by projecting a view normal to a common lateral seating surface 180.

To make a double-sided insert as described above in connection with FIGS. 1 through 7, a "blank" insert is first formed in a press machine by a top punch and a bottom punch. The blank insert is formed by placing powdered metal in a mold in the press machine and "pressing" the powder in the mold using the top and bottom punches. The top punch imparts the top face geometry, the bottom punch forms the bottom face geometry, and the mold forms the geometry or the peripheral sides. The blank insert is thus formed as a single piece, and then sintered. The sintered insert is then ground to create the finished insert having the desired final geometry and features, such as the convex cutting edges with curved cutting edge region, one or more substantially straight cutting edge regions and associated planar facets (in certain embodiments), nose radii, common lateral seating surfaces, angled clearances, conical clearances, and the like. The blank insert can have the same general top/bottom side geometry as the finish insert. However, the blank insert can be slightly larger, for example, about 0.2 mm per side, extending in radial direction, in order to allow the press formed, sintered insert to be ground to provide the desired final peripheral geometry.

FIG. 8(a) and FIG. 8(b) illustrate an embodiment of a milling tool system 200 comprising a tool holder 201 which can hold, for example, five identical single-handed double-sided cutting inserts 202a to 202e. Such a milling tool system can comprise a cutter body and one or more of the previously described double-sided cutting inserts operationally associated with the cutter body for applying the one or more double-sided cutting inserts to a work piece.

FIG. 8a is a side view showing the cutting axis 203 of the tool holder, or cutter body 201, being perpendicular to a line 205 representing the work piece surface to be operated upon. FIG. 8(b) is an top, or end, view showing five cutting inserts 202a-202e held by the cutter body 201 in a circular array around the center "C" of the radial center lines 204. As illustrated, all of the single-handed double-sided cutting inserts 202a-202e can have four identical convex cutting edges connected by four identical nose corners, as described previously. Each convex cutting edge can further comprise a curved cutting edge region, and may have a primary substantially straight cutting edge region. Additionally, a secondary substantially straight cutting edge region may optionally be provided, as previously described in connection with FIGS. 1 through 4. The primary substantially straight cutting edge regions of all of the cutting inserts 202a-202e are parallel to the assumed work piece surface 205.

FIGS. 9 and 10 illustrate further embodiments of double-sided cutting inserts with alternative geometric shapes. In particular, all of the previously described embodiments of double-sided cutting inserts are generally square shaped and thus have four peripheral sides surfaces associated with each of the top and bottom faces. However, it will be understood by those of ordinary skill in the art that other geometric shapes can also be made.

For example, referring to FIGS. 9(a) and 9(b), in which FIG. 9(a) is a perspective view and FIG. 9(b) is a side view, there is shown an embodiment of a generally pentagon shaped double-sided cutting insert 230. Based upon the same principles discussed hereinabove in connection with the description of the generally square shaped double-sided cutting inserts having four identical convex cutting edges on each of the top and bottom faces, the generally pentagon shaped cutting insert 230 shown similarly has a top face 231 and a bottom face 232 separated by a virtual middle plane 233. The top face 231 of double-sided cutting insert 230 can have five convex cutting edges, e.g., convex cutting edge 251, each connected by a nose corner, e.g., nose corner 254, a common lateral seating surface, e.g., common lateral seating surface 248, and five peripheral side surfaces 241-245, each of which can be indexable about the center 246 of the through screw hole 247, which means this double-sided cutting insert 230 has a total of ten indexable cutting edges. Each of the five convex cutting edges can be identical. Using only one peripheral side surface 241 of the top face 231 as a representative example, each convex cutting edge 251 can have at least a curved cutting edge region 252, and may also have a primary substantially straight cutting edge region 253 provided between the curved cutting edge region 252 and the nose corner 254. Each curved cutting edge region 252 can have the aforesaid big radius, greater than or equal to two times the largest radius that can be inscribed on the top face 231. Additionally, each of the peripheral side surfaces 241-245 associated with the top face 231 can comprises a primary conical peripheral surface 255, extending from the curved cutting edge region 252 toward the virtual middle plane 233, and a secondary conical peripheral surface 257, extending from the nose corner 254 toward the virtual middle plane 233. Additionally, where a primary substantially straight cutting edge region 253 is provided, the peripheral side surface 241 can further comprise a primary planar facet 256, extending from the primary substantially straight cutting edge region 253 toward the virtual middle plane 233. Each lateral common seating surface 248 can be formed on an adjacent pair of primary conical peripheral surfaces extending from the top face 231 and the bottom face 232, respectively, in the same, or a similar, manner as described previously in connection with common lateral seating surface on the generally square shaped double-sided cutting inserts. Where the primary substantially straight cutting edge region 253 and associated primary planar facet 256 are included, the double-sided cutting insert 230 will be, as shown, single-handed, in the same direct, for both the top face 231 and the bottom face 232. It is understood that the bottom face 232 likewise has the same number and types of features as the top face 231, including five convex cutting edges connected by nose corners, and in which each convex cutting edge can comprise at least a curved cutting edge region, and may further have a primary substantially straight cutting edge region. The bottom face 232 likewise has four peripheral side surfaces comprising the various conical peripheral surfaces and planar facets described above in connection with the top face 231, which in the same manner extend from the convex cutting edges on the bottom face 232 towards the virtual middle plane 233.

Referring now to FIGS. 10(a) and 10(b), in which FIG. 10(a) is a perspective view and FIG. 10(b) is a top view, an embodiment of a generally triangular shaped double-sided cutting insert 260 is shown having a top face 261 and a bottom face 262 separated by a virtual middle plane 263. The double-sided cutting insert 260 has a total of three peripheral side surfaces 271-273 associated with the top face 261, which are indexable about the center 274 of a through screw hole 277, which means that this double-sided cutting insert 260 has a total of six indexable cutting edges. Using just the peripheral side surface 271 of the top face 261 as a representative example, each convex cutting edge 281 can comprises only a curved cutting edge region 282 which is connected to a nose corner 284. Each of the three convex cutting edges on each of the top 261 and bottom 262 faces can be identical. The curved cutting edge 282 can have a radius greater than or equal to two times the largest radius that can be inscribed on the top face 261. Each peripheral side surface 271-273 of the top face 261 of the double-sided cutting insert 260 can further comprise a primary conical peripheral surface 285, extending from the curved cutting edge region 282 toward the virtual middle plane 263, and a secondary conical peripheral surface 287 extending from the nose corner 284 toward the virtual middle plane 263. Furthermore, a common lateral seating surface 278 can be provided adjacent pairs of primary conical peripheral surfaces which each extend towards the virtual middle plane 263 from respective top 261 and bottom 262 faces. It is to be understood that the bottom face 262 can have identical convex cutting edges and associated peripheral side surfaces the same as on the top face 261. Likewise, the convex cutting edges on the bottom face 262 can have the same curved cutting edge regions, and the peripheral side surfaces associated with the bottom face 262 can have the same primary and secondary conical peripheral surfaces as the top face 261. In this particular embodiment, the double-sided cutting insert 260 is not single-handed for both the top face 261 and the bottom face 262, and the top 261 and bottom 262 faces are thus not twisted relative to each other.

Further referring to FIGS. 11(a) and 11(b), in which FIG. 11(a) is a perspective view and FIG. 11(b) is a top view, another embodiment of a triangular shaped double-sided cutting insert 290 is shown similar to the triangular shaped double-sided insert 260 shown in FIGS. 10(a) and 10(b). The double-sided cutting insert 290 similarly has a top face 291 and a bottom face 292 separated by a virtual middle plane 293. The double-sided cutting insert 290 has a three peripheral side surfaces 301-303 associated with the top face 291, which are indexable about the center 304 of a through hole 307, which means that each of top face 291 and bottom face 292 together have a total of six indexable cutting edges. Using the peripheral side surface 301 of the top face 291 as a representative example, it can be seen that each peripheral side surface 301-303 has a convex cutting edge 311 connected to a nose corner 314. In this embodiment, each convex cutting edge 311 can comprises both a curved cutting edge region 312 and a primary substantially straight cutting edge region 313, located between the curved cutting edge region 312 and the nose corner 314. The curved cutting edge 312 can, like previously described embodiments of double-sided cutting inserts, have the big radius which is greater than or equal to two times the radius of the largest circle that can be inscribed on the top face 291. Each peripheral side surface 301-303 associated with the top face 291 can comprises a primary conical peripheral surface 315 extending from the curved cutting edge region 312 toward the virtual middle plane 293, a primary planar facet 316 extending from the primary substantially straight cutting edge region 313 toward the virtual middle plane 293, and a secondary conical peripheral surface 317 extending from a nose corner 314 toward the virtual middle plane 293. Furthermore, a common lateral seating surface 308 can be provided on adjacent pairs of primary conical peripheral surfaces which each extend towards the virtual middle plane 293 from respective top 301 and bottom 302 faces. Just as described above in connection with the generally triangular shaped double-sided cutting insert 260, and the generally pentagon shaped double-sided cutting insert 230, it is to be understood that the bottom face 302 can have identical convex cutting edges and associated peripheral side surfaces which are the same as on the top face 301. Likewise, the convex cutting edges on the bottom face 262 can have the same curved cutting edge regions, and the peripheral side surfaces associated with the bottom face 302 can have the same primary and secondary conical peripheral surfaces as the top face 301. In this particular embodiment, having the primary substantially straight cutting edge region 313, the double-sided cutting insert 290 is single-handed for both the top face 301 and the bottom face 302, such that the top 301 and bottom 302 faces are thus twisted relative to each other.

In various embodiments, a single-sided or double-sided high feed milling insert or inserts may be configured to provide a ramping function, which may be important for mold and/or pocket milling, for example. In more detail, FIGS. 12(a)-(c) illustrate a non-limiting embodiment of a double-sided high feed milling insert. FIG. 12(a) is a three-dimensional view of a double-sided high feed milling insert 400 comprising a center hole 403, a top face 401 including a chip breaker 404, and an identical or nearly identical bottom face 402. The top face 401 of the double-sided high feed milling insert 400 may include four nose corners 405-408. A complete cutting edge may be provided between each pair of adjacent nose corners, providing four cutting edges 411-414 on the top face 402. Since the bottom face 402 may be identical to the top face 401, the bottom face 402 also may include four cutting edges, such as cutting edge 421, for example. Now referring to FIGS. 12(b)-(c), wherein FIG. 12(b) is a front side view and FIG. 12(c) is a top view of high feed milling insert 400, in at least one non-limiting embodiment, each of the four cutting edges 411-414 on the top face 401 may be identical, and the bottom face 402 may be identical to the top face 401. Accordingly, in at least one non-limiting embodiment, a pair of cutting edges is representative of each pair of cutting edges and is described below. In such embodiment, the pair of representative cutting edges may be the cutting edge 411 (between the nose corners 405 and 408) at the top face 401 and the corresponding cutting edge 421 at the bottom face 402, for example.

In more detail, as shown in FIGS. 12(a)-(c), the cutting edge 411 at the top face 401 may comprise a secondary convex cutting edge 411a, a primary substantially straight cutting edge 411b, and a primary convex cutting edge 411c. Similarly, the cutting edge 421 at the bottom face 402 may comprise a primary convex cutting edge 421a, a primary substantially straight cutting edge 421b, and a secondary convex cutting edge 421c. The convexity of cutting edges 411a, 411c, 421a, and 421c can be appreciated from a top view of the milling insert 400, such as that shown in FIG. 12(c), for example. Additionally, a three-dimensional Cartesian or an XYZ coordinate system may help to elucidate certain features of the milling insert 400. For example, as seen in FIG. 12(b), an XOZ plane is provided wherein the X axis is aligned in the virtual middle plane 450 of the double-sided high feed milling insert 400, and, as seen in FIG. 12(c), an XOY plane is provided wherein the Y axis is collinear with the reference line 461, which may bisect the angle A_index. The angle A_index may be equal to approximately 90 degrees as the top face and the bottom face include four identical or nearly identical cutting edges, for example. As shown in FIG. 12(b), the primary substantially straight cutting edge 411b may form a portion of a primary planar facet 433 which may be truncated by an angled surface 452 and a lateral face 451 perpendicular to the top face 401, for example. The position of the primary planar facet 433 near the top face 401, as represented by one of its boundaries 441, may be twisted or rotated about point G by an angle A_twist. The angle A_twist may be measured from a reference line 443, which represents the boundary 441's position if it were not twisted. Correspondingly, the position of the primary planar facet 434 near the bottom face 402 may be twisted or rotated by the same angle A_twist from the dotted line 443 to one of its boundaries 442 which, subsequently, may be co-linear with the boundary 441 as indicated by the reference line 444.

Now, referring to FIG. 12(c), a top view of milling insert 400 is shown. As mentioned above, the cutting edge 411 (see also FIGS. 12(a)-(b)) may comprise cutting edges 411a, 411b, and 411c, at or near the top face 401 (see FIG. 12(a)), and the cutting edge 411 may be formed between nose corner 408 located at point C and nose corner 405 located at point D. The starting point of the primary substantially straight cutting edge 411b may start at point E and may be connected with reference line 462 that has an angle of A_tw1 with respect to the reference line 461 bisecting the angle A_index. The secondary convex cutting edge 411a may be connected to both the adjacent nose corner 408 and the adjacent primary substantially straight cutting edge 411b. The primary convex cutting edge 411c may be tangent to an inner reference circle, such as inscribed circle 455, for example, and may also be connected to both the adjacent primary substantially straight cutting edge 411b and the adjacent nose corner 405. Mathematically, the three cutting edge regions 411a, 411b, and 411c may be expressed in the following matrix formats, respectively:

$$\begin{bmatrix} X^2+Y^2 & X & Y & 1 \\ x_1^2+y_1^2 & x_1 & y_1 & 1 \\ x_2^2+y_2^2 & x_2 & y_2 & 1 \\ x_3^2+y_3^2 & x_3 & y_3 & 1 \end{bmatrix} = 0 \text{ and } Z = T/2 \quad (9)$$

$$\begin{bmatrix} X & Y & 1 \\ x_3 & y_3 & 1 \\ x_4 & y_4 & 1 \end{bmatrix} = 0 \text{ and } Z = T/2 \quad (10)$$

$$\begin{bmatrix} X^2+Y^2 & X & Y & 1 \\ x_4^2+y_4^2 & x_4 & y_4 & 1 \\ x_5^2+y_5^2 & x_5 & y_5 & 1 \\ x_6^2+y_6^2 & x_6 & y_6 & 1 \end{bmatrix} = 0 \text{ and } Z = T/2 \quad (11)$$

Again, equation (9) represents the secondary convex cutting edge 411a, equation (10) represents the primary substantially straight cutting edge 411b and equation (11) represents the primary convex cutting edge 411c. In equations (9)-(11), $(x_1, y_1)$, $(x_2, y_2)$ and $(x_3, y_3)$ are the three points on the secondary convex cutting edge 411a, $(x_3, y_3)$ and $(x_4, y_4)$ are the two points on the primary substantially straight cutting edge 411b, and $(x_4, y_4)$, $(x_5, y_5)$ and $(x_6, y_6)$ are the three points on the primary convex cutting edge 411c. Further, in equations (9)-(11), T is the thickness of the double-sided high feed milling insert 400 (see FIG. 12(b)). Since all six points $(x_1, y_1)$ to $(x_6, y_6)$ are at the top face 401, where z=T/2, a general form of these points may be established as $(x_i, y_i, T/2)$ and i=1 to 6. Then, a geometric transformation through a rotation of $\theta=180°$ about the Y axis (as shown in FIG. 12(c)) can be established to transform each point $(x_i, y_i, T/2)$ at the top face 401 to the bottom face 402, as given by the following equation (12) and equation (13).

$$R_Y(\theta = 180°) = \begin{bmatrix} \cos(\theta) & 0 & -\sin(\theta) & 0 \\ 0 & 1 & 0 & 0 \\ \sin(\theta) & 0 & \cos(\theta) & 0 \\ 0 & 0 & 0 & 1 \end{bmatrix} = \begin{bmatrix} -1 & 0 & 0 & 0 \\ 0 & 1 & 0 & 0 \\ 0 & 0 & -1 & 0 \\ 0 & 0 & 0 & 1 \end{bmatrix} \quad (12)$$

$$(x'_i, y'_i, z'_i, 1) = (x_i, y_i, T/2, 1) \begin{bmatrix} -1 & 0 & 0 & 0 \\ 0 & 1 & 0 & 0 \\ 0 & 0 & -1 & 0 \\ 0 & 0 & 0 & 1 \end{bmatrix} = \quad (13)$$

$$(-x_i, y_i, -T/2, 1) \text{ where } i = 1 \ldots 6,$$

Once all points at the bottom face 402 $((x'_i, y'_i, z'_i)$ where i=1 . . . 6) are obtained, the secondary convex cutting edge region 421c (which may be identical to cutting edge region 411a), the primary substantially straight cutting edge region 421b (which may be identical to cutting edge region 411b), and the primary convex cutting edge region 421a (which may be identical to cutting edge region 411c and also tangent to inner reference circle 455) can be mathematically described, respectively.

Further, referring to FIG. 12(c), since the Y axis may be co-linear with the reference line 461 which bisects the angle A_index between two adjacent nose corners, such as nose corners 505 and 508, for example, the following relationships may exist between a cutting edge region at the top face 401 and a corresponding cutting edge region at the bottom face 402:

$$L\_facet1 = L\_facet2;$$

$$D\_facet1 = D\_facet2;$$

$$A\_tw1 = A\_tw2;$$

radius of convex cutting edge region 421*a*=radius of convex cutting edge region 411*c*, and radius of convex cutting edge region 421*c*=radius of convex cutting edge region 411*a*.

Now referring to FIG. 12(*b*), a representative peripheral side surface (i.e., one of the four identical or nearly-identical peripheral side surfaces of insert 400), extending from the top face 401 to the bottom face 402, of the double-sided high feed cutting insert 400, may comprises the following regional peripheral side faces:

(i) a first primary conical peripheral surface 432 extending from the primary curved convex cutting edge region 411*c* at the top face 401 toward the secondary curved convex cutting edge region 421*c* at the bottom face 402, which is adjacent to a secondary conical peripheral surface 438 (belonging to another peripheral side surface) extending from the nose corner 405 at the top face 401 toward the nose corner 436 at the bottom face 402;

(ii) a first primary planar surface (or facet) 433 near the top face 401, truncated by an angled surface 452 and a lateral face 451 (perpendicular to the top face 401) above the virtual middle plane 450, extending from the primary substantially straight cutting edge region 411*b* at the top face 401 toward the virtual middle plane 450; and, correspondingly, a second primary planar surface 434 (or facet) near the bottom face 402, truncated by an angled surface 454 and a lateral face 453 (perpendicular to the bottom face 402) below the virtual middle plane 450, extending from the primary substantially straight cutting edge region 421*b* at the bottom face 402 toward the virtual middle plane 450; additionally, the two lateral faces 451 and 453 may merge into one common lateral face for seating both the top face 401 and the bottom face 402;

(iii) a second primary conical peripheral surface 431 extending from the secondary curved convex cutting edge region 411*a* at the top face 401 toward the primary curved convex cutting edge region 421*a* at the bottom face 402; and (iv) a secondary conical peripheral surface 439 extending from the nose corner 408 at the top face 401 toward the nose corner 437 at the bottom face 402.

As may be seen in a top view of the milling insert 400, such as that provided by FIG. 12(*c*), the first primary conical peripheral surface 432, as mathematically constructed and described above, may form a negative clearance surface having a variable clearance angle (due to the nature of a conical clearance surface formed by two twisted convex cutting edges) ranging from approximately zero (0) degrees at the nose corner 405 located at point D to a maximal negative value at the primary straight cutting edge 421*b* located at point F. Further, the primary curved convex cutting edge 411*c* at the top face may extend downward and outward to the twisted secondary curved convex cutting edge 421*c* at the bottom face. Similarly, the second primary conical peripheral surface 431, as mathematically constructed and described above, may form a positive clearance surface having a variable clearance angle (due to the nature of a conical clearance surface formed by two twisted convex cutting edges) ranging from 0 at the nose corner 408 located at point C to a maximal positive value at the primary straight cutting edge region 411*b* located at point E. Further, the secondary curved convex cutting edge region 411*a* at the top face may extend downward and inward to the twisted primary curved convex cutting edge region 421*a* at the bottom face.

Accordingly, in at least one non-limiting embodiment, when the cutting edge 411 at the top face 401 is presented on a tool holder to be used in a milling operation, the first primary conical peripheral surface 432 with variable negative clearance angles may be used for cutting to any specific depth of cut, while the second primary conical peripheral surface 431 with variable positive clearance angles may be used for ramping when there is a need or desire for such a milling operation. Correspondingly, when the cutting edge 421 at the bottom face 402 is presented on a tool holder to be used in a milling operation, i.e., the bottom face 402 is flipped to become a top face for performing a milling operation, the second primary conical peripheral surface 431 with variable negative clearance angles may be used for cutting to any specific depth of cut while the first primary conical peripheral surface 432 with variable positive clearance angles may be used for ramping when there is a need or desire for such a milling operation.

Figure 13:
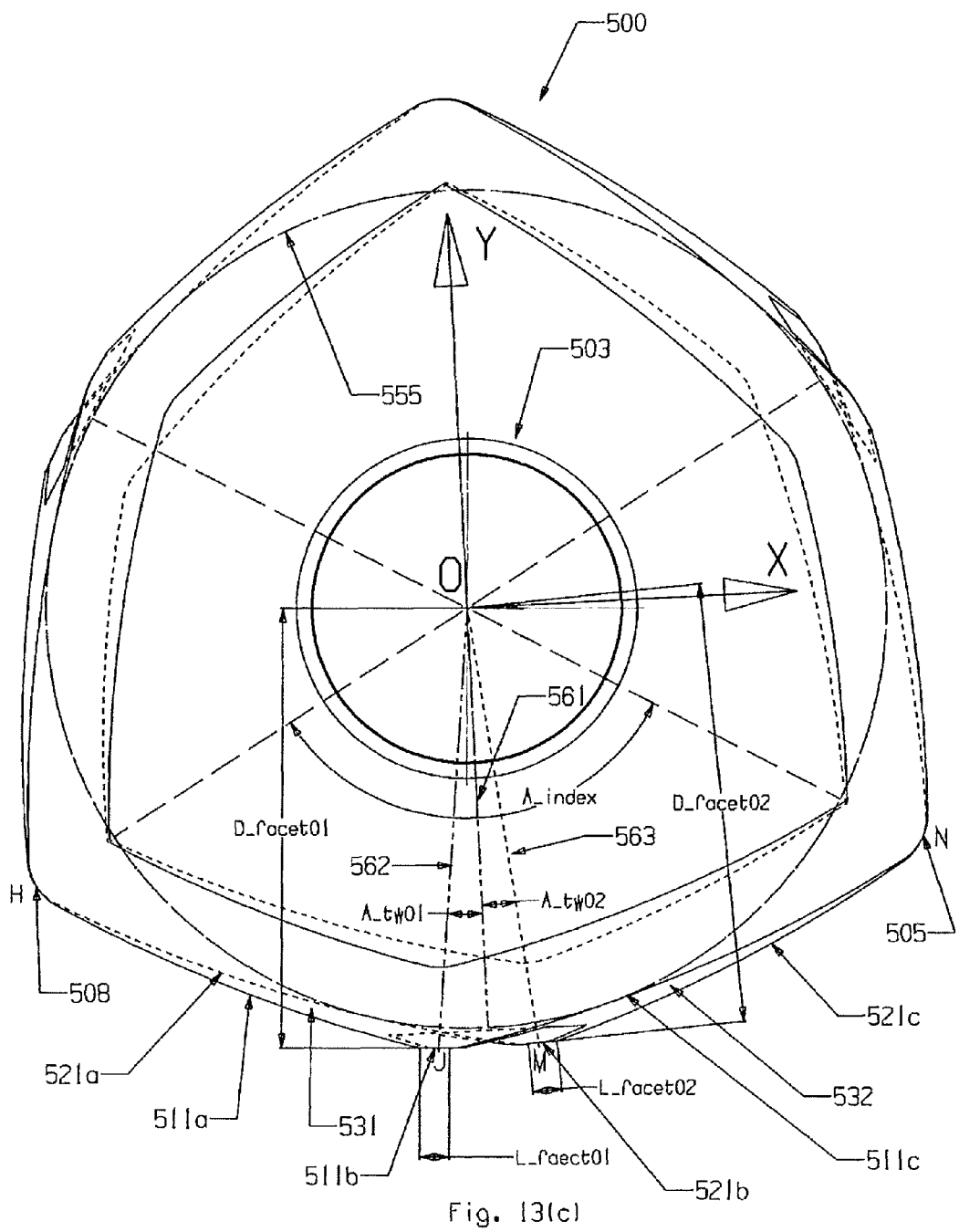

FIGS. 13(*a*)-(*c*) further illustrate another exemplary non-limiting embodiment of a double-sided high feed milling insert. FIG. 13(*a*) is a three-dimensional view of a double-sided high feed milling insert 500 comprising a center hole 503, a top face 501 including a chip breaker 504, and an identical or nearly identical bottom face 502. In various embodiments, the top and bottom faces 501 and 502 may comprise a flat face or a flat face with a chamfer at the peripheral cutting edges, for example. Three nose corners 505, 506 and 508 may be included on the top face 501 of the double-sided high feed milling insert 500, and a complete cutting edge may be provided between a pair of adjacent nose corners. Thus, in total, there may be three cutting edges 511-513 on the top face 502. Likewise, since the bottom face 502 may be identical or nearly identical to the top face 501, there may also be three cutting edges on the bottom face 502, such as cutting edge 521, for example. Now referring to FIGS. 13(*b*)-(*c*), wherein FIG. 13(*b*) is a front-side view and FIG. 13(*c*) is a top view of milling insert 500, since cutting edges 511-513 on the top face 501 may be identical and the bottom face 502 may be identical to the top face 501, only a pair of representative cutting edges, such as the cutting edge 511 (between the nose corners 505 and 508) at the top face 501 and the corresponding cutting edge 521 at the bottom face 502, are described in detail below.

In more detail and as shown in FIGS. 13(*a*)-(*c*), the cutting edge 511 at the top face 501 comprises a secondary convex cutting edge region 511*a*, a primary substantially straight cutting edge region 511*b*, and a primary convex cutting edge region 511*c*. Similarly, the cutting edge 521 at the bottom face 502 comprises a primary convex (as seen from a top view) cutting edge region 521*a*, a primary substantially straight cutting edge region 521*b*, and a secondary convex (as seen from a top view) cutting edge region 521*c*. The convexity of cutting edges 511*a*, 511*c*, 521*a*, and 521*c* can be appreciated from a top view of the milling insert 500, such as that shown in FIG. 13(*c*), for example. Additionally, a three-dimensional Cartesian or an XYZ coordinate system may help to elucidate certain features of the milling insert 500. For example, as seen in FIG. 13(*b*), an XOZ plane is provided wherein the X axis is aligned in the virtual middle plane 550 of the double-sided high feed milling insert 500, and, as seen in FIG. 13(*c*), an XOY plane is provided wherein the Y axis is collinear with the reference line 561, which may bisect the angle A_index. The angle A_index may be equal to approximately 120 degrees as there are three identical or nearly identical cutting edges per each top and bottom face, for example. As shown in FIG. 13(b), the primary substantially straight cutting edge region 511b may form a primary planar facet 533 which may be truncated by an angled surface 552 and a lateral seating face 551 perpendicular to the top face 501. Alternatively, in various embodiments, the angled surface 552 may be used as a seating face and the lateral seating face 551 may be at an angle of less than 90 degrees to the top face 501. For example, in at least one embodiment, the angle between the lateral seating face 551 and the top face 501 may be between about 45 to about 90 degrees. Additionally, in at least one embodiment, the angle between the lateral seating face 551 and the top face 501 may be slightly less than 90 degrees. In any event, the position of the primary planar facet 533 near the top face 501, as represented by one of its boundaries 541, may be twisted or rotated about point W by an angle A_twist. The angle A_twist may be measured from a reference line 543, which represents the position of the boundary 541 if it were not twisted. Correspondingly, the position of the primary planar facet 534 near the bottom face 502 may be twisted or rotated by the same angle A_twist from the dotted line 543 to one of its boundaries 542 which, subsequently, may be co-linear with the boundary 541, as indicated by the reference line 544.

Now referring to FIG. 13(c), a top view of milling insert 500 is shown. As mentioned above, the cutting edge 511 (see also FIGS. 13(a)-(b)) may comprise cutting edges 511a, 511b, and 511c, at or near the top face 501 (see FIG. 13(a)), and the cutting edge 511 may be formed between nose corner 508 located at point H and nose corner 505 located at point N. The primary substantially straight cutting edge region 511b may intersect at point J with reference line 562. Reference line 562 may have an angle of A_tw01 with the reference line 561 bisecting the angle A_index. The secondary convex cutting edge region 511a may be connected to both the adjacent nose corner 508 and the adjacent primary substantially straight cutting edge region 511b. The primary convex cutting edge region 511c may be tangent to inner reference circle 555, and may also be connected to both the adjacent primary substantially straight cutting edge region 511b and the adjacent nose corner 505. Mathematically, the three cutting edge regions 511a, 511b, and 511c may also be expressed by the above-discussed equations (9)-(11), respectively. Similarly, the corresponding points as determined by the above-discussed equations (12)-(13) at the bottom face 502 can be obtained to mathematically describe the secondary convex cutting edge region 521c (which may be identical to cutting edge region 511a), the primary substantially straight cutting edge region 521b (which may be identical to cutting edge region 511b), and the primary convex cutting edge region 521a (which may be identical to cutting edge region 511c and also tangent to inner reference circle 555), respectively.

Further referring to FIG. 13(c), since the Y axis may be co-linear with the line 561 which bisects the angle A_index between two adjacent nose corners, such as nose corners 505 and 508, for example, the following relationships may exist between a cutting edge region at the top face 501 and a corresponding cutting edge region at the bottom face 502:

$$L\_facet01 = L\_facet02;$$

$$D\_facet01 = D\_facet02;$$

$$A\_tw01 = A\_tw02;$$

radius of convex cutting edge region 521a=radius of convex cutting edge region 511c; and radius of convex cutting edge region 521c=radius of convex cutting edge region 511a.

Now referring to FIG. 13(b), a representative peripheral side surface (from one of the three identical or nearly-identical peripheral side surfaces), extending from the top face 501 to the bottom face 502, may comprise the following four regional peripheral side faces:

(i) a first primary conical peripheral surface 532 extending from the primary curved convex cutting edge region 511c at the top face 501 toward the secondary curved convex cutting edge region 521c at the bottom face 502, which is adjacent to a secondary conical peripheral surface 538 (belonging to another peripheral side surface) extending from the nose corner 505 at the top face 501 toward the nose corner 536 at the bottom face 502;

(ii) a first primary planar surface (or facet) 533 near the top face 501, truncated by an angled surface 552 and a lateral seating face 551 (perpendicular or forming an angle less or slightly less than 90 degrees to the top face 501) above the virtual middle plane 550, extending from the primary substantially straight cutting edge region 511b at the top face 501 toward the virtual middle plane 550; and correspondingly a second primary planar surface (or facet) 534 near the bottom face 502, truncated by an angled surface 554 and a lateral seating face 553 (perpendicular or forming an angle less or slightly less than 90 degrees to the bottom face 502) below the virtual middle plane 550, extending from the primary substantially straight cutting edge region 521b at the bottom face 502 toward the virtual middle plane 550; additionally, in the case that the lateral face 551 is perpendicular to the top face 501 and the lateral face 553 is perpendicular to the bottom face 502, the two lateral seating faces 551 and 553 may merge into one common lateral face seating for both top face 501 and bottom face 502, and in embodiments where the lateral face 551 forms an angle less or slightly less than 90 degrees to the top face 501 and the lateral face 553 forms an angle less or slightly less than 90 degrees to the bottom face 502, the two lateral seating faces 551 and 553 may intersect at the virtual middle plane 550 and form a folded common lateral face for seating both top face 501 and bottom face 502;

(iii) a second primary conical peripheral surface 531 extending from the secondary curved convex cutting edge region 511a at the top face 501 toward the primary curved convex cutting edge region 521a at the bottom face 502; and (iv) a secondary conical peripheral surface 539 extending from the nose corner 508 at the top face 501 toward the nose corner 537 at the bottom face 502.

As may be seen in a top view of the milling insert 500, such as that provided by FIG. 13(c), the first primary conical peripheral surface 532, as mathematically constructed and described above, may form a negative clearance surface having a variable clearance angle (due to the nature of a conical clearance surface formed by two twisted convex cutting edges) ranging from approximately zero (0) degrees at the nose corner 505 located at point N to a maximal negative value at the primary straight cutting edge region 521b located at point M. Further, the primary curved convex cutting edge region 511c at the top face may extend downward and outward to the twisted secondary curved convex cutting edge region 521c at the bottom face. Similarly, the second primary conical peripheral surface 531, as mathematically constructed and described above, may form a positive clearance surface having a variable clearance angle (due to the nature of a conical clearance surface formed by two twisted convex cutting edges) ranging from zero (0) degrees at the nose corner 508 located at point H to a maximal positive value at the primary straight cutting edge region 511b located at point J. Further, the secondary curved convex cutting edge region 511a at the top face may be extended downward and inward to the twisted primary curved convex cutting edge region 521a at the bottom face.

Accordingly, when the cutting edge 511 at the top face 501 is presented on a tool holder to be used in a milling operation, the first primary conical peripheral surface 532 with variable negative clearance angles may be used for cutting to any specific depth of cut while the second primary conical peripheral surface 531 with variable positive clearance angles may be used for ramping when there is a need or desire for such a milling operation. Correspondingly, when the cutting edge 521 at the bottom face 502 is presented on a tool holder to be used in a milling operation, the second primary conical peripheral surface 531 with variable negative clearance angles may be used for cutting to any specific depth of cut, while the first primary conical peripheral surface 532 with variable positive clearance angles may be used for ramping when there is a need or desire for such a milling operation.

FIGS. 14(a)-(b) illustrate another non-limiting embodiment of a double-sided high feed milling insert, which may be generally similar to the milling insert 500 illustrated in FIGS. 13(a)-(c) and described above, except, at least, that the cutting edge 611 further comprises an optional secondary substantially straight cutting edge region 621 between the nose corner 608 and the secondary convex cutting edge region 611a. There may be three such secondary substantially straight cutting edge regions 621, 622 and 623 on the top face 610, dimensionally indicated by the length L_2nd_facet, one on each indexable cutting edge. Since the top face 601 may be identical or nearly identical to the bottom face 602, there are also three secondary substantially straight cutting edge regions, such as the secondary substantially straight cutting edge region 631 on the bottom face 602, for example. Therefore, as shown in FIG. 14(b), each cutting edge, with the cutting edge 611 on the top face as a representative example, may comprise a primary convex cutting edge region 611c, a primary substantially straight cutting edge region 611b, a secondary convex cutting edge region 611a, and a secondary substantially straight cutting edge region 621 between two adjacent nose corner 605 and 608. The convexity of cutting edges 611a and 611c can be appreciated from a top view of the milling insert 400, such as that shown in FIG. 14(b), for example. Each secondary substantially straight cutting edge region may form a secondary planar surface (or facet) by extending downward, for example. Specifically, the secondary substantially straight cutting edge region 621 at the top face 601 may form at least a portion of the secondary planar surface (or facet) 641 and the secondary substantially straight cutting edge region 631 at the bottom face 602 may form at least a portion of the secondary planar surface (or facet) 646.

In various embodiments, the addition of the secondary substantially straight cutting edge region 621 to the cutting edge 611 may improve the surface finish of a side wall of a workpiece being machined by one or more cutting inserts 600, for example. This may be achieved by constructing a secondary substantially straight cutting edge region 622 at an adjacent cutting edge on the same top face 601 such that the secondary substantially straight cutting edge region 622 is oriented approximately perpendicular to the primary substantially straight cutting edge region 611b of the current cutting edge 611 being presented to a tool holder. In such embodiments, the primary substantially straight cutting edge region 611b may be perpendicular to the rotation axis of the tool holder.

Accordingly, referring to FIG. 14(a), any one of the three identical or nearly identical peripheral side surfaces of the cutting insert 600 may extend from the top face 601 to the bottom face 602, and may comprise the following regional peripheral side faces: a first secondary planar surface (or facet) 646 near the bottom face 602, a first primary conical peripheral surface 643, a first primary planar surface (or facet) 644 near the top face 601, a second primary planar surface (or facet) 645 near the bottom face 602, a second primary conical peripheral surface 642, a second secondary planar surface (or facet) 641 near the top face 601, and a secondary conical peripheral surface 637.

Accordingly, certain non-limiting embodiments of the single-handed double-sided cutting inserts for high feed milling are described herein. The single-handed double-sided cutting inserts may be of known sizes and shapes, and may be adapted for conventional use in a variety of drilling applications. It will be understood that the present description may illustrate only those aspects of the embodiments of the disclosure relevant to providing a clear understanding thereof, and that certain aspects would be apparent to those of ordinary skill in the art. Therefore, such aspects as would not be necessary to facilitate a better understanding of the disclosure may not be present in order to simplify the description.

Furthermore, although only a limited number of embodiments of the disclosure are necessarily described herein, one of ordinary skill in the art will, upon considering the foregoing description, recognize that many modifications and variations of the disclosure may be employed. All such variations and modifications of the disclosure are intended to be covered by the foregoing description and the following claims.

What is claimed is:

1. A double-sided cutting insert having a plurality of convex cutting edges, said double-sided cutting insert comprising:
   a. a top face and a bottom face separated by a virtual middle plane;
   b. at least three convex cutting edges on each of said top and bottom faces, each convex cutting edge having at least a curved cutting edge region;
   c. at least three nose corners on each of said top and bottom faces, each nose corner connecting two of said convex cutting edges; and
   d. at least three peripheral side surfaces extending from each of said top and bottom faces to said virtual middle plane, each peripheral side surface comprising:
      i. a first primary conical peripheral surface extending from a primary curved convex cutting edge region at said top face toward a twisted secondary curved convex cutting edge region at said bottom face, and a second primary conical peripheral surface extending from a secondary curved convex cutting edge region at said top face toward a twisted primary curved convex cutting edge region at said bottom face;
      ii. a first primary planar surface extending from a primary substantially straight cutting edge region at said top face to a virtual middle plane, and a second primary planar surface extending from a primary substantially straight cutting edge region at said bottom face toward a virtual middle plane, wherein both said first and second primary planar surfaces are truncated by at least a common lateral face which is one of perpendicular or at an angle that is less than 90 degrees to both said top and bottom faces; and
      iii. a secondary conical peripheral surface extending from a nose corner toward said virtual middle plane.

2. The double-sided cutting insert of claim 1 wherein each of said top and bottom faces is provided with one of a chip breaker geometry, a flat face geometry, or a flat face geometry with chamfer at peripheral cutting edges.

3. The double-sided cutting insert of claim 2 wherein each of said top and bottom faces is single-handed in the same direction.

4. The double-sided cutting insert of claim 1 wherein:
 a. each of said top and bottom faces is single-handed in the same cutting direction;
 b. each said convex cutting edge further comprises a primary substantially straight cutting edge region intermediate said curved cutting edge region and said nose corner; and
 c. each said peripheral side surface further comprises a primary planar facet extending from said primary substantially straight cutting edge toward said virtual middle plane.

5. The double-sided cutting insert of claim 4 wherein each of said top and bottom faces is provided with chip breaker geometry.

6. The double-sided cutting insert of claim 4 wherein:
 a. each convex cutting edge further comprises a secondary substantially straight cutting edge region intermediate said primary substantially straight cutting edge region and said nose corner; and
 b. each said peripheral side surface further comprises a secondary planar facet extending from said secondary substantially straight cutting edge toward said virtual middle plane.

7. The double-sided cutting insert of claim 1 wherein each primary conical peripheral surface associated with said top face extends outwardly and toward said virtual middle plane at a first angle relative thereto, and each primary conical peripheral surface associated with said bottom face also extends outwardly and toward said virtual middle plane at said first angle relative thereto.

8. The double-sided cutting insert of claim 1 wherein each said common lateral surface is formed by truncating portions of said adjacent pairs of peripheral side surfaces.

9. The double-sided cutting insert of claim 8 wherein each said common lateral surface terminates short of each said curved cutting edge region.

10. The double-sided cutting insert of claim 1 further comprising:
 a. at least one plateau on each of said top and bottom faces, said plateau defining a plane generally perpendicular to said virtual middle plane; and
 b. wherein each said common lateral seating surface is one of generally perpendicular or at an angle less than 90 degrees to said plateau.

11. The double-sided cutting insert of claim 1 wherein each nose corner comprises at least one of a circular arc, a series of circular arcs, and a multi-segment spline curve.

12. The double-sided cutting insert of claim 1 wherein each said curved cutting edge region has a radius which is at least two times the radius of the largest circle that may be inscribed on said top or bottom face of said double-sided cutting insert.

13. The double-sided cutting insert of claim 1 wherein each said curved cutting edge region has a radius which is at least four times the radius of the largest circle that may be inscribed on said top or bottom face of said double-sided cutting insert.

14. The double-sided cutting insert of claim 1 further comprising chip breaking geometry provided on each of said top and bottom faces.

15. The double-sided cutting insert of claim 1 wherein said top face is a mirror image of said bottom face about said virtual middle plane.

16. The double-sided cutting insert of claim 15 further comprising chip breaking geometry provided on each of said top and bottom faces.

17. The double-sided cutting insert of claim 1 wherein each said convex cutting edge further comprises at least one of a portion of an ellipse, a portion of a parabola, and a multi-segment spline curve.

18. The double-sided cutting insert of claim 1, wherein at least one convex cutting edge comprises a secondary substantially straight cutting edge region positioned adjacent to one of the nose corners and adjacent to one of the secondary convex cutting edge regions.

19. A milling tool system comprising:
 a. a cutter body and at least one double-sided cutting insert; and
 b. said at least one double-sided cutting insert comprising:
  i. a top face and a bottom face separated by a virtual middle plane;
  ii. at least three convex cutting edges on each of said top and bottom faces, each convex cutting edge having at least a curved cutting edge region;
  iii. at least three nose corners on each of said top and bottom faces, each nose corner connecting two of said convex cutting edges; and
  iv. at least three peripheral side surfaces extending from each of said top and bottom faces to said virtual middle plane, each peripheral side surface comprising:
   a first primary conical peripheral surface extending from a primary curved convex cutting edge region at said top face toward a twisted secondary curved convex cutting edge region at said bottom face, and a second primary conical peripheral surface extending from a secondary curved convex cutting edge region at said top face toward a twisted primary curved convex cutting edge region at said bottom face;
   a first primary planar surface extending from a primary substantially straight cutting edge region at said top face to a virtual middle plane, and a second primary planar surface extending from a primary substantially straight cutting edge region at said bottom face toward a virtual middle plane, wherein both said first and second primary planar surfaces are truncated by at least a common lateral seating face which is one of perpendicular or at an angle less than 90 degrees to both said top and bottom faces; and
   a secondary conical peripheral surface extending from a nose corner toward said virtual middle plane.

20. The milling tool system of claim 19 wherein said cutter body has at least one cutting insert pocket for holding said at least one double-sided cutting insert, wherein said at least one cutting insert pocket comprises:
 a. a bottom support surface adapted to abut one of said top and bottom faces of said double-sided cutting insert when such is secured in said cutting insert pocket;
 b. a pair of lateral support walls on said bottom surface, each adapted to abut one of said common lateral seating surfaces of said double-sided cutting insert.

21. The milling tool system of claim 20 further comprising said cutter body having a plurality of said cutting insert pockets, each adapted to receive one of said double-sided cutting inserts.

22. The milling tool system of claim 19 wherein each of said top and bottom faces of said cutting insert is provided with chip breaker geometry.

23. The milling tool system of claim 22 wherein each of said top and bottom faces is single-handed in same direction.

24. The milling tool system of claim 18 wherein:
  a. each of said top and bottom faces is single-handed in the same cutting direction;
  b. each said convex cutting edge further comprises a primary substantially straight cutting edge region intermediate said curved cutting edge region and said nose corner; and
  c. each said peripheral side surface further comprises a primary planar facet extending from said primary substantially straight cutting edge toward said virtual middle plane.

25. The milling tool system of claim 24 wherein each of said top and bottom faces is provided with chip breaker geometry.

26. The milling tool system of claim 24 wherein:
  a. each convex cutting edge further comprises a secondary substantially straight cutting edge region intermediate said primary substantially straight cutting edge region and said nose corner; and
  b. each said peripheral side surface further comprises a secondary planar facet extending from said secondary substantially straight cutting edge toward said virtual middle plane.

27. The milling tool system of claim 18 wherein each primary conical peripheral surface associated with said top face extends outwardly and toward said virtual middle plane at a first angle relative thereto, and each primary conical peripheral surface associated with said bottom face also extends outwardly and toward said virtual middle plane at said first angle relative thereto.

28. The milling tool system of claim 19 wherein each said common lateral seating surface is formed by truncating portions of said adjacent pairs of peripheral side surfaces.

29. The milling tool system of claim 28 wherein each said common lateral seating surface terminates short of each said curved cutting edge region.

30. The milling tool system of claim 19 further comprising:
  a. at least one plateau on each of said top and bottom faces, said plateau defining a plane generally perpendicular to said virtual middle plane; and
  b. wherein each said common lateral seating surface is one of generally perpendicular or at an angle less than 90 degrees to said plateau.

31. The milling tool system of claim 19 wherein each nose corner comprises at least one of a circular arc, a series of circular arcs, and a multi-segment spline curve.

32. The milling tool system of claim 19 wherein each said curved cutting edge region has a radius which is at least two times the radius of the largest circle that may be inscribed on said top or bottom face of said double-sided cutting insert.

33. The milling tool system of claim 19 wherein each said curved cutting edge region has a radius which is at least four times the radius of the largest circle that may be inscribed on said top or bottom face of said double-sided cutting insert.

34. The milling tool system of claim 19 further comprising chip breaking geometry provided on each of said top and bottom faces.

35. The milling tool system of claim 19 wherein said top face is a mirror image of said bottom face about said virtual middle plane.

36. The milling tool system of claim 35 further comprising chip breaking geometry provided on each of said top and bottom faces.

37. The milling tool system of claim 19 wherein each said convex cutting edge further comprises at least one of a portion of an ellipse, a portion of a parabola, and a multi-segment spline curve.

38. The double-sided cutting insert of claim 19, wherein at least one convex cutting edge comprises a secondary substantially straight cutting edge region positioned adjacent to one of the nose corners and adjacent to one of the secondary convex cutting edge regions.

* * * * *

UNITED STATES PATENT AND TRADEMARK OFFICE
CERTIFICATE OF CORRECTION

PATENT NO.       : 8,491,234 B2
APPLICATION NO.  : 12/854382
DATED            : July 23, 2013
INVENTOR(S)      : X. Daniel Fang et al.

It is certified that error appears in the above-identified patent and that said Letters Patent is hereby corrected as shown below:

In the Claims:

Column 29, line 10, delete "The milling tool system of claim 18 wherein:" and substitute therefor -- The milling tool system of claim 19 wherein: --.

Column 29, line 33, delete "The milling tool system of claim 18 wherein each" and substitute therefor -- The milling tool system of claim 19 wherein each --.

Column 30, line 35, delete "The double-sided cutting insert of claim 19, wherein at" and substitute therefor -- The milling tool system of claim 19, wherein at --.

Signed and Sealed this
Seventeenth Day of September, 2013

Teresa Stanek Rea
*Deputy Director of the United States Patent and Trademark Office*